United States Patent
Hamada et al.

(10) Patent No.: US 8,743,270 B2
(45) Date of Patent: Jun. 3, 2014

(54) FOCUS ADJUSTMENT APPARATUS AND FOCUS ADJUSTMENT METHOD

(75) Inventors: Masataka Hamada, Suwon-si (KR); Jong-hoon Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 391 days.

(21) Appl. No.: 13/048,013

(22) Filed: Mar. 15, 2011

(65) Prior Publication Data

US 2011/0221952 A1     Sep. 15, 2011

(30) Foreign Application Priority Data

Mar. 15, 2010   (KR) .................. 10-2010-0023031

(51) Int. Cl.
*H04N 5/232*    (2006.01)
*G03B 13/00*    (2006.01)

(52) U.S. Cl.
USPC .......................................... 348/349; 348/345

(58) Field of Classification Search
USPC .................................................. 348/345, 349
See application file for complete search history.

(56) References Cited

U.S. PATENT DOCUMENTS

| | | | |
|---|---|---|---|
| 5,815,748 A * | 9/1998 | Hamamura et al. | 396/104 |
| 6,262,769 B1 * | 7/2001 | Anderson et al. | 348/333.1 |
| 2008/0159728 A1 * | 7/2008 | Wu et al. | 396/121 |
| 2008/0284901 A1 * | 11/2008 | Misawa | 348/349 |

FOREIGN PATENT DOCUMENTS

JP      11-215426      8/1999

* cited by examiner

*Primary Examiner* — Anthony J Daniels
(74) *Attorney, Agent, or Firm* — Drinker Biddle & Reath LLP

(57) ABSTRACT

Focus adjustment apparatus and methods for effectively autofocusing on a subject by adaptively changing a shape of a focus area according to a determined image condition, and in particular, setting the focus area in a shape of which a width of an upper part is narrow according to the condition.

13 Claims, 22 Drawing Sheets

POSITIONS OF DIVIDED AF AREAS

DIVIDED LIGHT MEASURING AREAS

FOCUS ADJUSTMENT APPARATUS AND FOCUS ADJUSTMENT METHOD

CROSS-REFERENCE TO RELATED PATENT APPLICATION

This application claims the benefit of Korean Patent Application No. 10-2010-0023031, filed on Mar. 15, 2010, in the Korean Intellectual Property Office, the entirety of which is incorporated herein by reference.

BACKGROUND

1. Field of the Invention

Embodiments generally relate to a focus adjustment apparatus and a focus adjustment method, for example, for use in a digital single lens reflex (DSLR) camera.

2. Description of the Related Art

If a focus area is enlarged in low brightness, a subject at a short distance and a subject at a long distance may both be found within the same focus detection area. For example, in a scene in which a main subject, e.g., a person, is at a short distance and a different subject, e.g., a night scene in the background, is at a long distance, far and near focus detection competition may occur, leading to undesirable results. For example, the contrast value of the background may be high, and the near subject may be out of focus while the background may be in complete focus, or no subject may be in complete focus because a focal point is located between the subject at a short distance and the subject at a long distance. In addition, if a plurality of dot light sources exist in the background, a maximum contrast value may not match an in-focus position due to the light sources in the focus area. Thus, when a plurality of such dot light sources exist, the subjects may be out of focus.

SUMMARY

Embodiments provide focus adjustment apparatus and methods for effectively focusing on a desired subject even in low brightness.

According to an embodiment, a focus adjustment apparatus comprises a focus lens; a focus lens driver for driving the focus lens in an optical axis direction; an image pickup unit for generating an image signal by converting image light incident through the focus lens into an electrical signal; a determiner for determining a condition; a focus area setting unit for setting a focus area in a shape of which a width of an upper part is narrow according to a determination result of the determiner; and a lens controller for controlling movement of the focus lens to adjust a focus on an image signal corresponding to the set focus area.

According to another aspect, a focus adjustment method comprises generating an image signal by converting image light incident through a focus lens into an electrical signal; determining a condition; setting a focus area in a shape of which a width of an upper part is narrow according to the determination; and moving the focus lens to adjust a focus on the image signal corresponding to the set focus area.

BRIEF DESCRIPTION OF THE DRAWINGS

The above and other features and advantages of the herein disclosed apparatus and methods will become more apparent in view of exemplary embodiments described with reference to the attached drawings in which.

DETAILED DESCRIPTION

Figure 1:
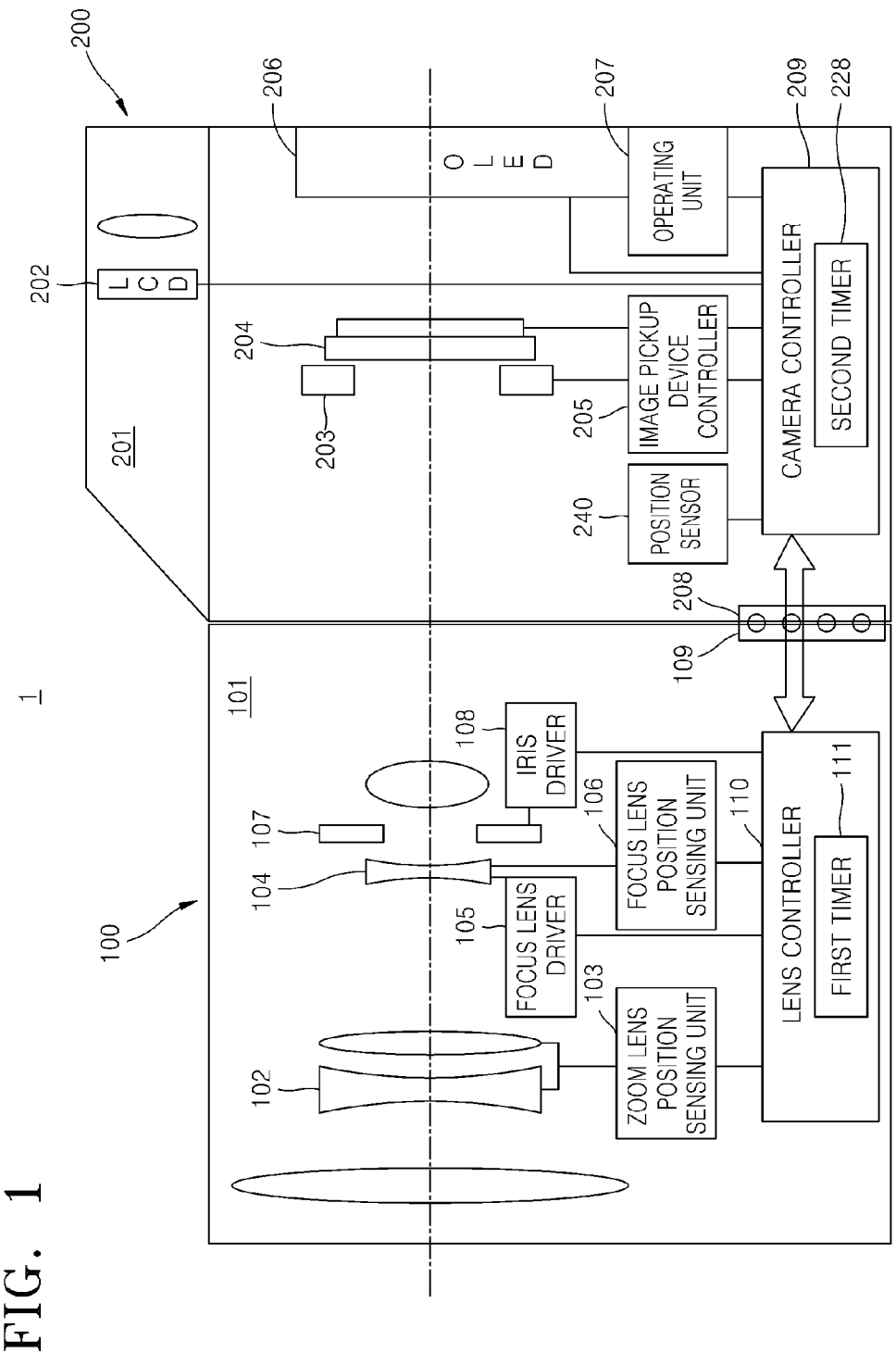
FIG. 1 is a diagram of a focus adjustment apparatus according to an exemplary embodiment.

The following description and the attached drawings are provided for better understanding of the disclosed exemplary embodiments. Descriptions of techniques or structures related to the described embodiments which would be obvious to one of ordinary skill in the art may be omitted.

The specification and the drawings are provided for the purpose of illustration and not limitation. Accordingly, the scope of the invention is determined by the claims and their equivalents.

Exemplary embodiments will now be described more fully with reference to the accompanying drawings, in which like reference numerals designate like parts.

FIG. 1 is a diagram of an exemplary focus adjustment apparatus. Although the focus adjustment apparatus of the embodiment is illustrated as a digital capturing device 1, the invention is not so limited and may be applied to various digital devices equipped with the focus adjustment apparatus, such as a Personal Digital Assistant (PDA) or a cellular phone.

Referring to FIG. 1, the digital capturing device 1 includes an interchangeable lens portion (hereinafter, lens) 100 and a main body portion (hereinafter, main body) 200. The lens 100 provides a focus detection function, and the main body 200 provides a function of driving a focus lens 104 of the lens 100.

The lens 100 includes an image forming optical system 101 including a zoom lens unit 102 (hereinafter, zoom lens) for zoom adjustment, a focus lens 104 for changing a focusing position, and an iris 107. The zoom lens 102 and the focus lens 104 may constitute a lens group in which a plurality of lenses are combined.

The lens 100 further includes a zoom lens position sensing unit 103, a focus lens position sensing unit 106, a focus lens driver (hereinafter lens driver) 105, an iris driver 108, a lens controller 110, and a lens mount 109.

The zoom lens position sensing unit 103 and the focus lens position sensing unit 106 sense positions of the zoom lens 102 and the focus lens 104, respectively. Timing for sensing a position of the focus lens 104 may be set by lens controller 110 or a camera controller 209, which will be described hereinafter. For example, the timing for sensing a position of the focus lens 104 may include timing for performing autofocusing (AF) detection from an image signal.

The lens driver 105 and the iris driver 108 drive the focus lens 104 and the iris 107, respectively, under the control of the lens controller 110. Specifically, the lens driver 105 drives the focus lens 104 in an optical axis direction (dashed line).

The lens controller 110 may include a first timer 111 for time measurement. The lens controller 110 may transmit the sensed position information of the focus lens 104 to the main body 200. When a position of the focus lens 104 varies, or when the camera controller 209 requests the position information of the focus lens 104, the lens controller 110 may transmit the sensed position information of the focus lens 104 to the main body 200. The first timer 111 may be reset by a reset signal received from the main body 200, for example, thereby synchronizing the time of the lens 100 and the time of the main body 200.

The lens mount 109 may include lens-side communication pins engaged with camera-side communication pins, which are described hereinafter, to be used for a communication path of one or more control signals, for example.

The main body 200 may include a view finder 201, a shutter 203, an image pickup device 204, an image pickup device controller 205, a display unit 206, an operating unit 207, the camera controller 209, and a camera mount 208.

The view finder 201 may include a Liquid Crystal Display (LCD) 202, which may display an image during image pickup in real time.

The shutter 203 may determine a time for exposing the image pickup device 204 to light, i.e., an exposure time.

The image pickup device 204 generates an image signal by picking up image light which has passed through the image forming optical system 101 of the lens 100. The image pickup device 204 may include, for example, a plurality of optoelectronic converters arranged in a matrix form and a horizontal transmission line for reading an image signal by moving electric charges from the plurality of optoelectronic converters. For the image pickup device 204, a Charge Coupled Device (CCD) sensor, a Complementary Metal Oxide Semiconductor (CMOS) sensor, or the like may be used.

The image pickup device controller 205 may generate a timing signal and control the image pickup device 204 to pick up an image according to the timing signal. In addition, the image pickup device controller 205 may sequentially read a horizontal image signal as electric charge accumulation to scanning lines ends. In the reading, the horizontal image signal may be used for AF detection by the camera controller 209.

The display unit 206 may display various kinds of images and information. For the display unit 206, an Organic Light Emitting Diode (OLED) or the like may be used.

The operating unit 207 is adapted for inputting from a user various kinds of instructions for operating the digital capturing device 1. The operating unit 207 may include one or more input devices such as a shutter release button, a main switch, a mode dial, and a menu button, for example.

Position sensor 240 is a device for sensing an orientation of the digital capturing device 1, and may include a switch. The position sensor 240 may sense whether the digital capturing device 1 is in horizontal orientation, in vertical orientation in which a right side of the digital capturing device 1 faces upward, or in vertical orientation in which a left side of the digital capturing device 1 faces upward relative to the ground. The switch may, for example, comprise a structure including a metallic ball and an electrode pattern, wherein the metallic ball moves under the influence of gravity and wherein an electrode on which the metallic ball is located is conductive.

The camera controller 209 calculates an autofocus (AF) evaluation value by performing AF detection using an image signal generated by the image pickup device 204. In addition, the camera controller 209 may record AF evaluation values at a plurality of AF detection times in response to a timing signal generated by the image pickup device controller 205, and may calculate a focal position using the focus lens position information received from the lens 100 and the recorded AF evaluation values. A calculation result of the focal position is transmitted to the lens 100. The camera controller 209 may include a second timer 228 for time measurement, the second timer 228 being simultaneously reset with the first timer 111 for the lens 100 and the main body 200 to be able to measure the same time.

The camera mount 208 includes the camera-side communication pins.

Exemplary operation of the lens 100 and the main body 200 will now be described.

When a subject image is being captured, operation of the digital capturing device 1 may start by operating the main switch of the operating unit 207. The digital capturing device 1 may perform a live view display as described below.

Image light of the subject passes through the image forming optical system 101, and is incident to the image pickup device 204. At this time, the shutter 203 is open. The incident image light is converted to an electrical signal by the image pickup device 204, thereby generating an image signal. The image pickup device 204 operates by a timing signal generated by the image pickup device controller 205. The generated image signal of the subject is converted to displayable data by the camera controller 209 and is output to the view finder 201 and/or the display unit 206. This operation is the live view display, and live view images displayed by the live view display may be continuously displayed as a moving picture.

In an embodiment, a shutter release button of the operating unit 207 may be pressed halfway to initiate an AF operation of the digital capturing device 1. The AF operation may be performed using the image signal generated by the image pickup device 204. In a contrast AF method, a focal position may be calculated from an AF evaluation value associated with a contrast value, and the lens 100 may be driven based on the calculation result. The AF evaluation value is calculated by the camera controller 209. The camera controller 209 calculates information for a control of the focus lens 104 from the AF evaluation value and transmits the information to the lens controller 110 via the lens-side and the camera-side communication pins included in the lens mount 109 and the camera mount 208, respectively.

The lens controller 110 performs AF by driving the focus lens 104 in an optical axis direction by controlling the lens driver 105 based on the received information. A position of the focus lens 104 is monitored by the focus lens position sensing unit 106, thereby establishing a feedback control.

When the zoom lens 102 zooms by a user's operation, the zoom lens position sensing unit 103 senses a position of the zoom lens 102, and the lens controller 110 performs AF again by modifying AF control parameters of the focus lens 104.

If an image of the subject is in complete focus by the operation described above, the digital capturing device 1 performs light exposure in a fully-pressed state S2 of the shutter release button. At this time, the camera controller 209 fully closes the shutter 203 and transmits measured light information acquired up to that time to the lens controller 110 as iris control information. The lens controller 110 controls the iris driver 108 based on the iris control information to operate the iris 107 to a proper iris value. The camera controller 209 controls the shutter 203 based on the measured light information to capture an image of the subject by opening the shutter 203 for a proper exposure time.

The captured image may be image signal processed, compressed, and/or recorded in a memory card 212. At the same time, the captured image may be output to the view finder 201 and/or the display unit 206 for displaying a subject image. Such an image is referred to herein as a quick view image.

Figure 2:
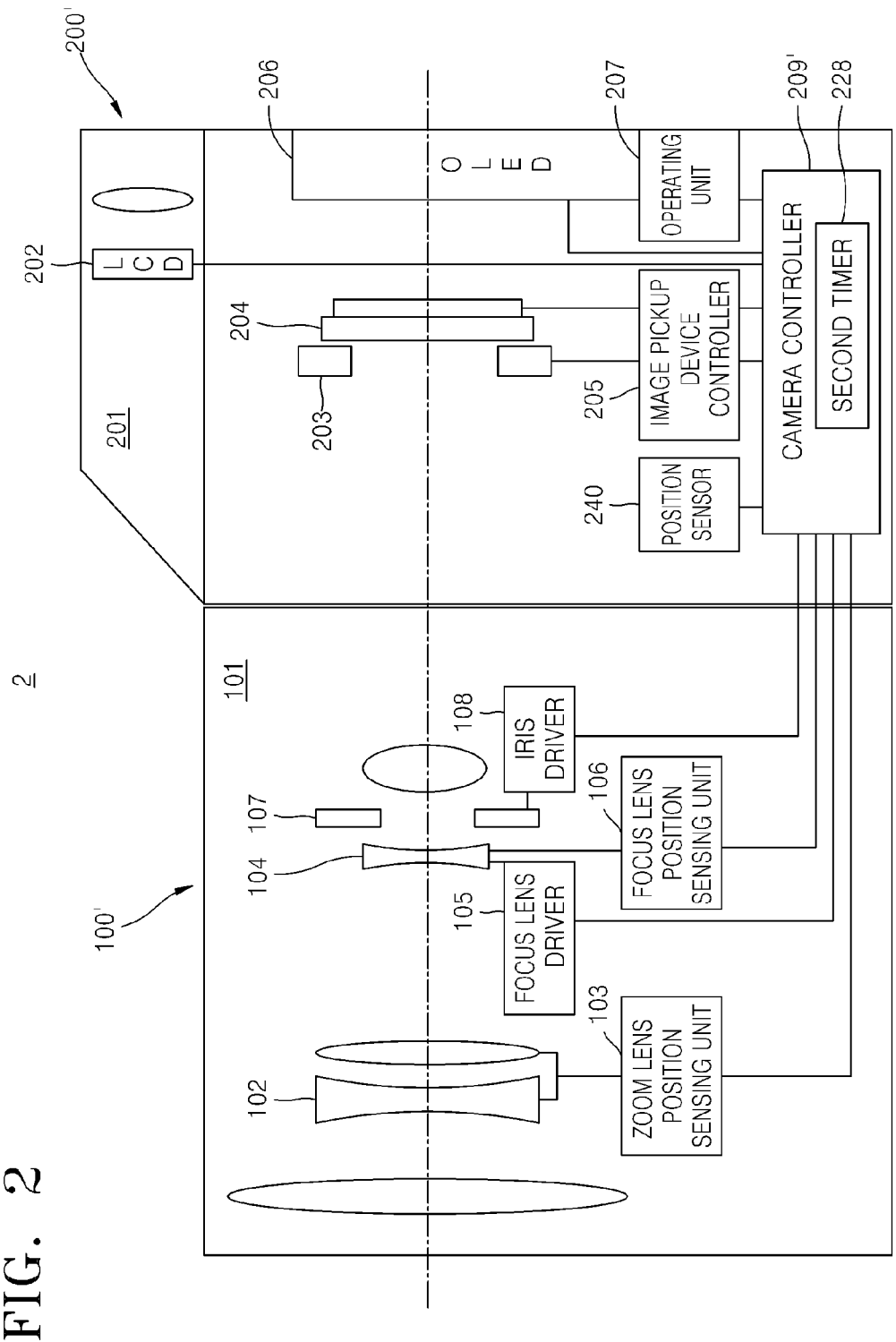
FIG. 2 is a diagram of a focus adjustment apparatus according to another exemplary embodiment.

FIG. 2 is a block diagram of a focus adjustment apparatus according to another exemplary embodiment. Because a digital capturing device 2 according to this embodiment has similar configuration and functions to the digital capturing device 1 illustrated in FIG. 1, differences between them will be mainly described.

In this embodiment, the digital capturing device 2 includes a lens 100' and a main body 200' as one body, and the lens mount 109 and the camera mount 208 illustrated in FIG. 1 are not included. Accordingly, an exchange of the lens 100' is not possible. A camera controller 209' may directly control the lens driver 105 and the iris driver 108 to drive the zoom lens 102, the focus lens 104, and the iris 107. In addition, the camera controller 209' may directly receive position information from the zoom lens position sensing unit 103 and the focus lens position sensing unit 106. That is, the camera controller 209' of FIG. 2 may provide some or all of the functionality of the lens controller 110 illustrated in FIG. 1.

Figure 3:
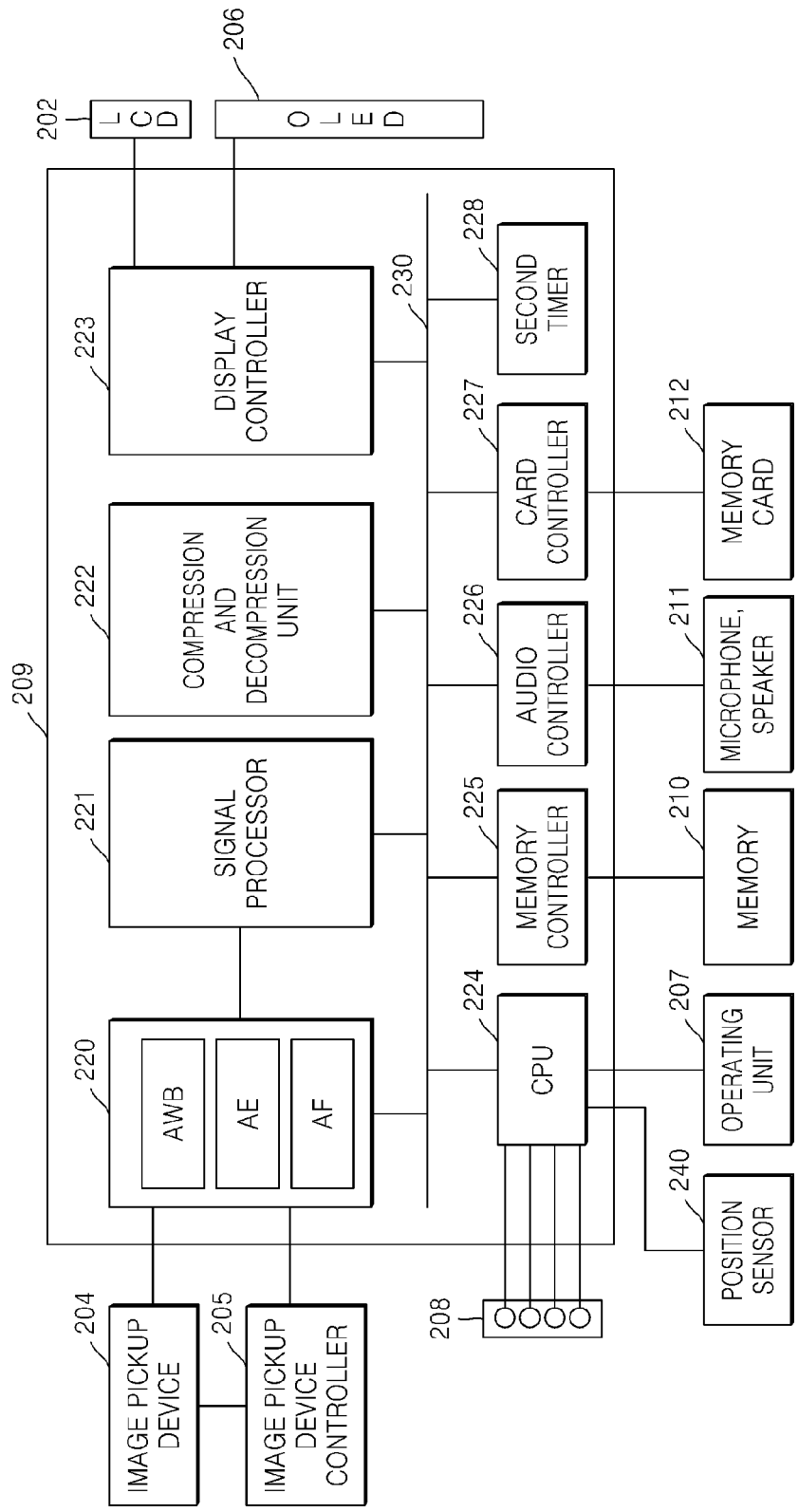
FIG. 3 is a block diagram of an exemplary camera controller of the focus adjustment apparatus illustrated in FIG. 1.

FIG. 3 is a block diagram of the camera controller 209 of the focus adjustment apparatus illustrated in FIG. 1, according to an exemplary embodiment. Although the camera controller 209 of the focus adjustment apparatus 1 illustrated in FIG. 1 is described, the present invention is not so limited. For example, some or all of the description may apply to the camera controller 209' of the focus adjustment apparatus 2 illustrated in FIG. 2, as well as other configurations.

Referring to FIG. 3, the camera controller 209 may include a pre-processing unit 220, a signal processor 221, a compression and decompression unit 222, a display controller 223, a Central Processing Unit (CPU) 224, a memory controller 225, an audio controller 226, a card controller 227, the second timer 228, and a main bus 230.

The camera controller 209 provides various kinds of instructions and data to components via the main bus 230.

The pre-processing unit 220 receives an image signal generated by the image pickup device 204 and performs calculation of Auto White Balance (AWB), Auto Exposure (AE), and/or Auto Focus (AF). That is, the pre-processing unit 220 calculates an AF evaluation value for focus adjustment, an AE evaluation value for exposure adjustment, and/or an AWB evaluation value for white balance adjustment. The AF evaluation value may include a horizontal AF evaluation value indicating a horizontal contrast. The horizontal AF evaluation value may be calculated by directly receiving a horizontal image signal when the horizontal image signal is read by the image pickup device 204. An AF module of the pre-processing unit 220 illustrated in FIG. 3 may include an AF evaluation value deriving unit (not shown).

The signal processor 221 may perform any of a series of image signal processing steps, such as gamma compensation, to generate a live view image or a captured image displayable on the display unit 206.

The compression and decompression unit 222 may perform compression and/or decompression of an image signal, for example, an image signal on which signal processing has been performed. In the case of compression, an image signal may be compressed in a reversible or a nonreversible compression format such as, for example, Joint Photographic Experts Group (JPEG) compression format or H.264 compression format. An image file including image data generated by the compression processing may be transmitted to and recorded in a memory card 212.

The display controller 223 controls an image output to a display screen such as the LCD 202 of the view finder 201 and/or the display unit 206.

The CPU 224 generally controls the operation of components. For example, in the case of the digital capturing device 1 illustrated in FIG. 1, the CPU 224 may communicate with the lens 100 to control certain of its operations.

The memory controller 225 controls a memory 210 for temporarily recording data such as a captured image or associated information, and the audio controller 226 controls a microphone or speaker 211. The card controller 227 controls the memory card 212 for recording captured images.

The second timer 228 is simultaneously reset with the first timer 111, thereby measuring time.

Illustrative operation of the camera controller 209 will now be described.

When the CPU 224 senses an operation of the operating unit 207, the CPU 224 enables the image pickup device controller 205 via the pre-processing unit 220. When an image signal is received from the image pickup device 204 to the pre-processing unit 220, AWB and AE calculation is performed. A result of the AWB and AE calculation is fed back to the image pickup device controller 205 for the image pickup device 204 to generate an image signal according to proper color output and proper exposure.

Meanwhile, a live view display may be performed as an operation of the digital capturing device 1 starts. At this time, an image signal captured with proper exposure is received by the pre-processing unit 220, and the camera controller 209 can calculate an AE evaluation value and the like. An image signal for live view display is provided by the pre-processing unit 220 to the signal processor 221, and the signal processor 221 may perform image signal processing on the image signal, such as interpolation processing of pixels. An image signal on which image signal processing has been performed is transmitted to the LCD 202 and/or to the display unit 206 via the main bus 230 and the display controller 223. The live view display may be updated, such as at a rate of 60 frames per second (fps), but is not so limited. For example, the live view display may be updated at a rate of 120 fps, 180 fps, 240 fps, or another value. The updating period may be set by the CPU 224 based on a measured light value, an AF condition, or the like. The updating period may also be set in other ways, such as by changing a timing signal by the image pickup device controller 205.

When the shutter release button is pressed halfway by a user, a half-pressed signal S1 is generated and sensed by the CPU 224, which instructs the lens controller 110 via the lens-side and the camera-side communication pins included in the camera mount 208 and the lens mount 109 to start driving the focus lens 104 for an AF operation. Alternatively, when the CPU 224 senses the generation of the half-pressed signal S1, the CPU 224 may control driving the focus lens 104 for an AF operation. The CPU 224 may thus function as a main controller.

The CPU 224 acquires an image signal from the image pickup device 204, and the pre-processing unit 220 calculates an AF evaluation value. The AF evaluation value is calculated according to the movement of the focus lens 104. A position of the focus lens 104 at which a contrast of an image of a subject will be maximized (i.e., a position in which the AF evaluation value is maximized) is calculated from a change of the AF evaluation value, and the focus lens 104 is moved to the calculated position. The series of operations is called an AF operation, and live view images may be continuously displayed during the AF operation. An image signal used for a live view image may be identical to an image signal used for calculating the AF evaluation value.

The digital capturing device 1 having lens 100 uses the camera-side and the lens-side communication pins included in the camera mount 208 and the lens mount 109, respectively, for communication between the lens 100 and the main body 200 during the AF operation.

The position of the focus lens 104 at the maximum contrast, i.e., the maximum AF evaluation value, may be calculated based on an image signal acquired by the image pickup device 204, and on a changing position of the focus lens 104 and corresponding changes in the AF evaluation value.

An AF area used to calculate the AF evaluation value in the AF operation will now be described.

Figure 4:
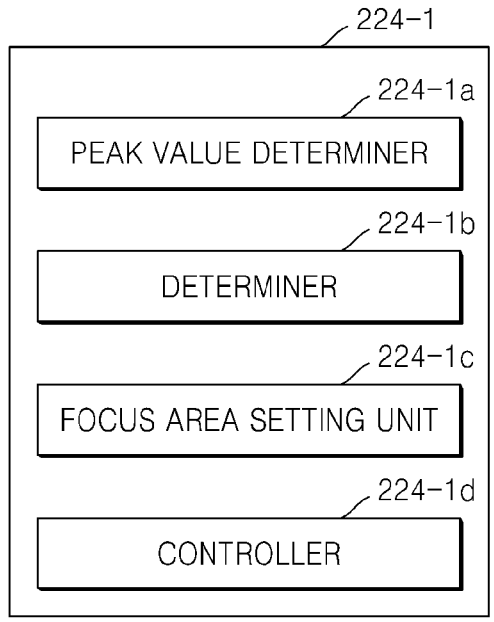
FIG. 4 is a block diagram of an exemplary CPU of the camera controller illustrated in FIG. 1.

FIG. 4 is a block diagram of an exemplary CPU 224 (designated 224-1) of the camera controller 209 illustrated in FIG. 1, according to an exemplary embodiment.

Referring to FIG. 4, the CPU 224-1 may include a peak value determiner 224-1a for determining a peak AF evaluation value based on information acquired by an AF processing unit (AF) included in the pre-processing unit 220, a determiner 224-1b for determining a condition, a focus area setting unit 224-1c for setting a focus area in a shape of which a width of an upper part is narrow according to a determination result of the determiner 224-1b, and a controller 224-1d for controlling a position of the focus lens 104 in an in-focus state using the AF evaluation value. The controller 224-1d may control the focus lens 104 to move it to a position corresponding to the peak AF evaluation value.

The determiner 224-1b may determine whether brightness of an image signal is low, by comparing brightness information of the image signal to reference brightness information. If the brightness of the image signal is not low, the focus area setting unit 224-1c may set a first focus area, and if the brightness of the image signal is low, the focus area setting unit 224-1c may set a second focus area which may be greater than the first focus area and which has a shape of which a width of an upper part is narrow. In the case of low brightness, or in a case where the AF operation is not successful with the first focus area, the second focus area may be set to be greater than the first focus area.

Alternatively, the determiner 224-1b may compare the peak AF evaluation value to a reference peak value. If the peak AF evaluation value is not less than the reference peak value, the focus area setting unit 224-1c may set the first focus area, and if the peak AF evaluation value is less than the reference peak value, the focus area setting unit 224-1c may set the second focus area, which is greater than the first focus area and has a shape of which a width of an upper part is narrow.

Alternatively, the determiner 224-1b may determine whether a current mode is a specific mode. If the current mode is not the specific mode, the focus area setting unit 224-1c may set the first focus area, and if the current mode is the specific mode, the focus area setting unit 224-1c may set the second focus area, which is greater than the first focus area and has a shape of which a width of an upper part is narrow.

For example, the specific mode may include a portrait mode, a night scene mode, and/or a moving picture mode. The portrait mode may be set to capture one or more persons as a subject. For example, the portrait mode is a mode in which a person is set as a subject and conditions for effectively capturing the person may be set, such as a person capturing mode and a night scene person capturing mode. Likewise, the night scene mode is a mode in which proper capturing conditions are pre-set to effectively capture a night scene or a scene having a condition of low intensity of illumination as in a night scene. A mode may comprise sub-modes, for example, the night scene mode may include a night scene capturing mode, a night scene person capturing mode, a fireworks capturing mode, and the like.

Further, the determiner 224-1b may determine two or more conditions. If at least one of the two or more conditions is met, the second focus area may be set. For example, the determiner may determine that the brightness of an image signal is low, and/or the peak AF evaluation value is less than a reference peak value, and/or the current mode is one of the portrait mode, the night scene mode, and the moving picture mode. If so, the second focus area may be set.

The second focus area may have a shape in which a width of an upper part is narrow. For example, if the second focus area is divided into an upper part and a lower part, the width of the upper part may be narrower than that of a lower part; or, if the second focus area is divided into an upper, intermediate, and lower parts, the upper part may be narrower than at least one of the intermediate and lower parts; or, the width of the uppermost part may be narrower than any other part when the second focus area is divided into four or more areas; or, the width of an upper part of the second focus area may be narrower than that of the first focus area. Illustratively, a shape in which a width of an upper part is narrow may include a protrusion, an I-shape, a cross shape (+), or the like. As used herein, the term "upper part" denotes a higher position in a direction opposite to that of gravity.

The focus area setting unit 224-1c may always set a focus area having a shape of which a width of an upper part is narrow relative to the ground according to orientation information of the digital capturing apparatus 1, which may be provided from the position sensor 240. That is, regardless of whether the digital capturing apparatus 1 is oriented in a horizontal or a vertical direction, the focus area setting unit 224-1c may set the second focus area having a shape of which a width of an upper part is narrow in a direction opposite to that of gravity.

Figure 5:
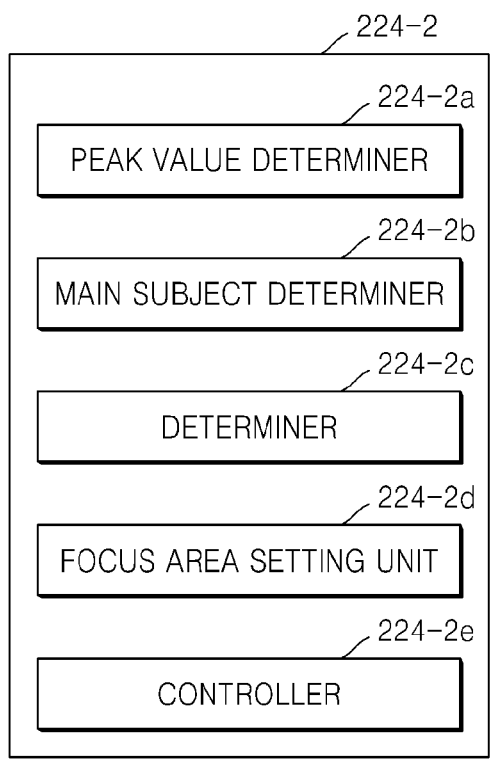
FIG. 5 is a block diagram of another exemplary CPU of the camera controller illustrated in FIG. 1.

FIG. 5 is a block diagram of an exemplary CPU 224 (designated 224-2) of the camera controller 209 illustrated in FIG. 1, according to another exemplary embodiment.

Referring to FIG. 5, the CPU 224-2 may include a peak value determiner 224-2a for determining a peak AF evaluation value using a plurality of AF evaluation values, which may be calculated using image signals respectively corresponding to a plurality of first focus areas, each first focus area including at least one area of a screen of the image pickup device 204, which may be acquired by an AF processing unit (AF) included in the pre-processing unit 220. The CPU 224-2 may also include a determiner 224-2c for determining a condition, a focus area setting unit 224-2d for setting a focus area in a shape of which a width of an upper part is narrow according to a determination result of the determiner 224-2c, and a controller 224-2e for controlling a position of the focus lens 104 in an in-focus state by using an AF evaluation value. The controller 224-2e may control the focus lens 104 to move to a position corresponding to the peak AF evaluation value.

In addition, the CPU 224-2 may further include a main subject determiner 224-2b for selecting a peak value of the AF evaluation values corresponding to the plurality of first focus areas, and determining a subject corresponding to the selected peak value as a main subject. The determiner 224-2c may compare the selected peak value to a reference peak value. If the selected peak value is not less than the reference peak value, the focus area setting unit 224-2d may set the first focus area; and if the selected peak value is less than the reference peak value, the focus area setting unit 224-2d may set the second focus area, which is greater than the first focus area and has a shape of which a width of an upper part is narrow. The second focus area may include the first focus area corresponding to the selected peak value and have a shape of which a width of an upper part is narrow.

The determiner 224-2c may perform the same function as that of the determiner 224-1b illustrated in FIG. 4.

When the main subject determiner 224-2b fails to determine a main subject, or when a user chooses to manually set a main subject, the user may set a size and/or a position of the focus area by using the operating unit 207. For example, the operating unit 207 may include a touch panel whereby the user may select a subject to be in complete focus from an image perceived via a live view display, using the user's touch. The size of the focus area may also be directly adjusted using the user's touch.

The focus area setting unit 224-2d may set a focus area always having a shape of which a width of an upper part is narrow relative the ground according to orientation information of the digital capturing apparatus 1, which is provided from the position sensor 240. That is, regardless of whether the digital capturing apparatus 1 is oriented in the horizontal or vertical direction, the focus area setting unit 224-2d may set the second focus area having a shape of which a width of an upper part is narrow in a direction opposite to that of gravity.

Although a CPU associated with an automatic focus adjustment apparatus is illustrated in FIGS. 1 and 2, the invention is not so limited, and may be applied to a manual focus adjustment apparatus, for example. Although not shown, the second focus area having a shape of which a width of an upper part is narrow may be set according to the determination condition described above with any one of the determiners described above and a focus area setting unit, and a user may manually adjust a focus by perceiving an image corresponding to the second focus area. The user may input a control signal for focus adjustment by using an operating unit or the like, and a controller may control movement of a focus lens so that a focus of the image corresponding to the second focus area is adjusted, i.e., the image corresponding to the second focus area is in complete focus, according to the control signal.

Figure 6A:
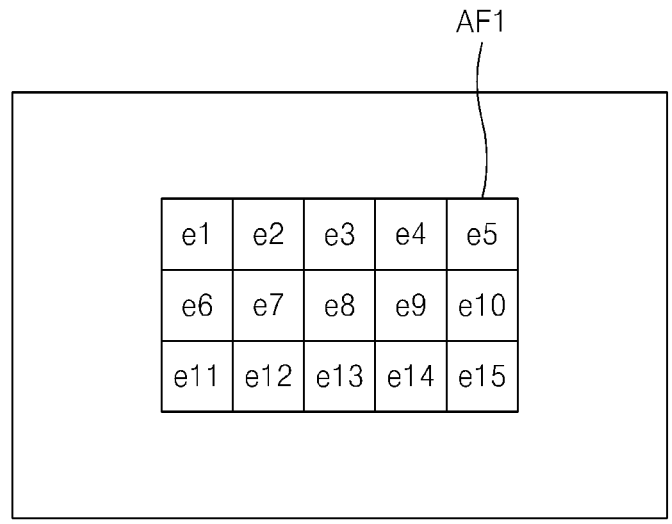
FIG. 6A illustrates positions of divided auto focus.
Figure 6B:
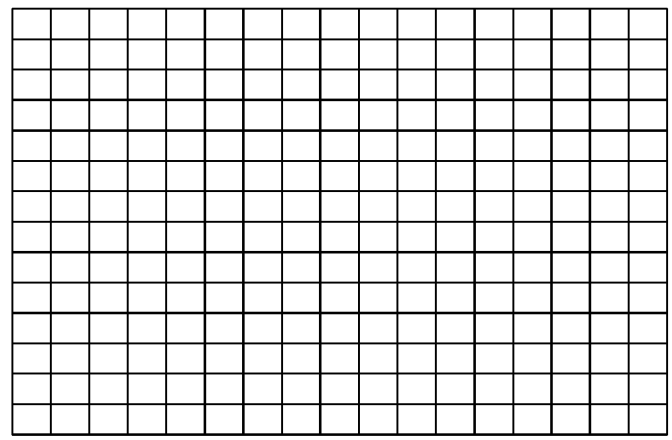
FIG. 6B illustrates divided light measuring areas.

FIG. 6A illustrates exemplary focus areas for a method in an AF mode, and FIG. 6B illustrates divided light measuring areas.

FIG. 6A illustrates focus areas for performing the method, i.e., 15 multi-divided AF areas, e1 to e15. FIG. 6B illustrates 14×18 light measuring areas. The above-described division formats are only exemplary embodiments and the invention is not limited thereto.

In operation, a specific position of a frame image corresponding to an image signal of the image pickup device 204 may be set to a multi-division focus area and an AE area. The image pickup device 204 sequentially arranges a first scanning line to an $n^{th}$ scanning line from the top. The image pickup device controller 205 controls the image pickup device 204 to sequentially output a horizontal image signal of the first scanning line to a horizontal image signal of the $n^{th}$ scanning line. Using the horizontal image signals, AF detection for automatic focus adjustment may be performed, and an AF evaluation value or a light measuring evaluation value for AE compensation may be obtained. The AF evaluation value may indicate information regarding a contrast of a subject. The light measuring evaluation value indicates brightness information and/or brightness distribution information of the subject.

Figure 7A:
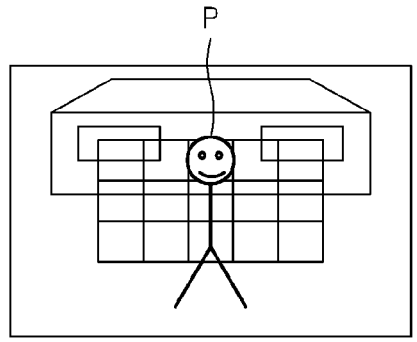
FIGS. 7A and 7B illustrate enlarging a focus area in a low brightness condition.
Figure 7B:
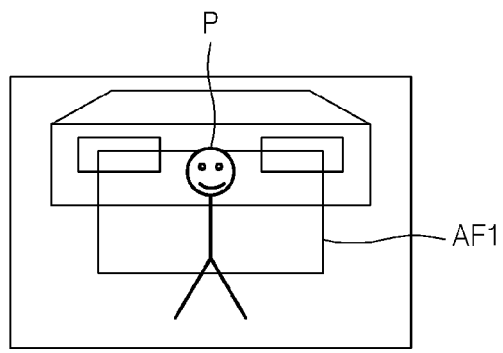

An exemplary operation of enlarging a focus area in a low brightness condition will now be described with reference to FIGS. 7A and 7B. Referring to FIG. 7A, an AF evaluation value sufficient in low brightness cannot be obtained from a plurality of small-sized focus areas, e.g., the 15 small-sized focus areas illustrated in FIG. 7A. Thus, as illustrated in FIG. 7B, a new AF evaluation value may be calculated by setting the 15 first focus areas to one large focus area AF1 through the sum of the 15 first focus areas, and a focus lens is driven according to the new AF evaluation value.

A subject at a short distance and a subject at a long distance may both be found in the same focus area. For example, in FIGS. 7A and 7B, a person is at a short distance, and a building is at a long distance. In a low light condition such as a night scene, far and near competition may occur. In this case, a subject in the background having a large contrast value may be in complete focus, or no subject may be in complete focus because a focal point is located automatically midway between the short distance and the long distance. Moreover, if a great number of dot light sources such as streetlights or bright windows exist in the background, a position of which a contrast value is maximum is not an in-focus position due to the mixed existence of the dot light sources in the focus area, because a dot light source of which an exposure amount is great has a high contrast value. Thus, even when a plurality of dot light sources exist randomly, subjects may be out of focus.

Figure 8A:
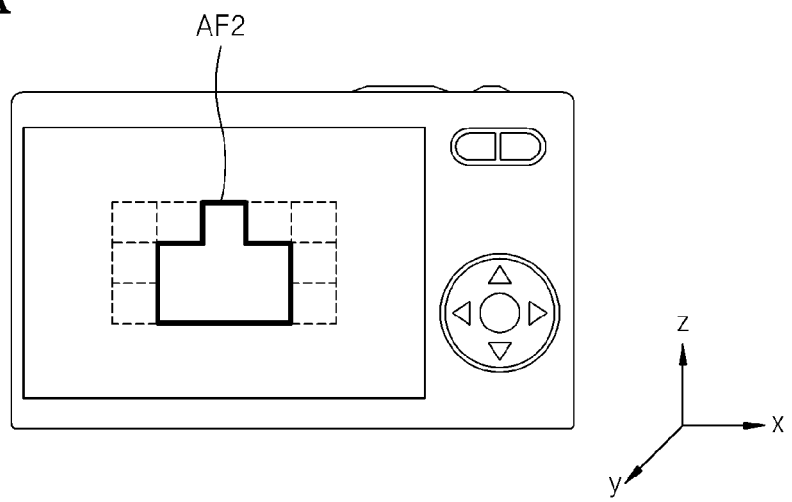
FIGS. 8A to 10 illustrate a focus area in a shape of which a width of an upper part is narrow.
Figure 8B:
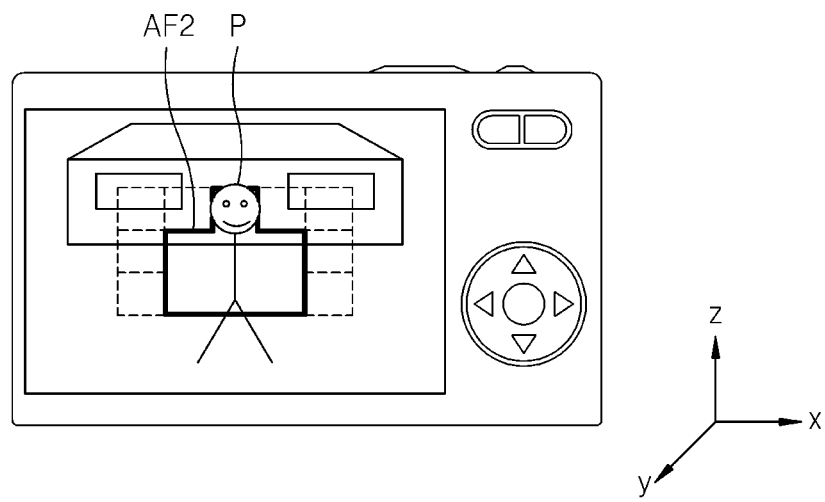

Accordingly, in the invention, in order to minimize an influence of a background subject when a focus area is enlarged in low brightness, a focus area AF2 having a shape of which an upper part protrudes may be set, as illustrated in FIG. 8A. For example, as illustrated in FIG. 8B, a probability that a background is out of the focus area AF2 increases by setting a face and body part of a person P as the focus area AF2 (this may be selected by a user or set automatically) in the case of an image including the background and the person P. Thus, even if enlarged, the focus area AF2 may reduce an influence of far and near competition and/or an influence of background dot light sources.

Figure 8C:
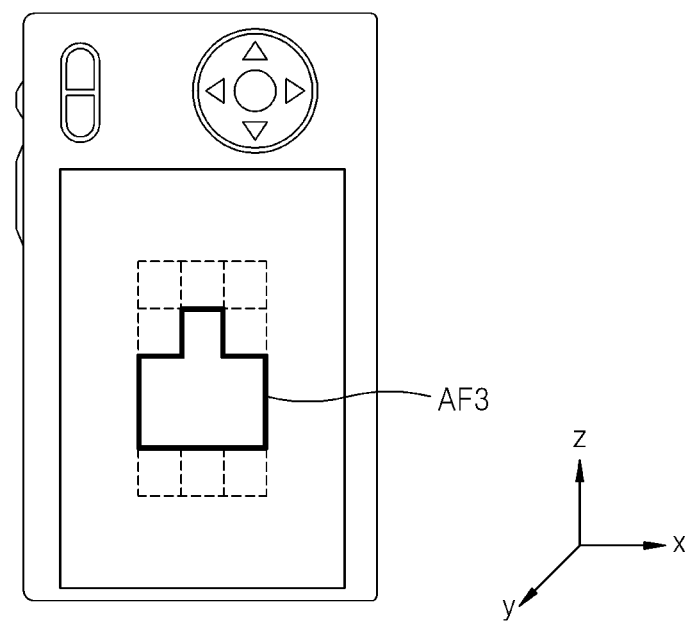
Figure 8D:
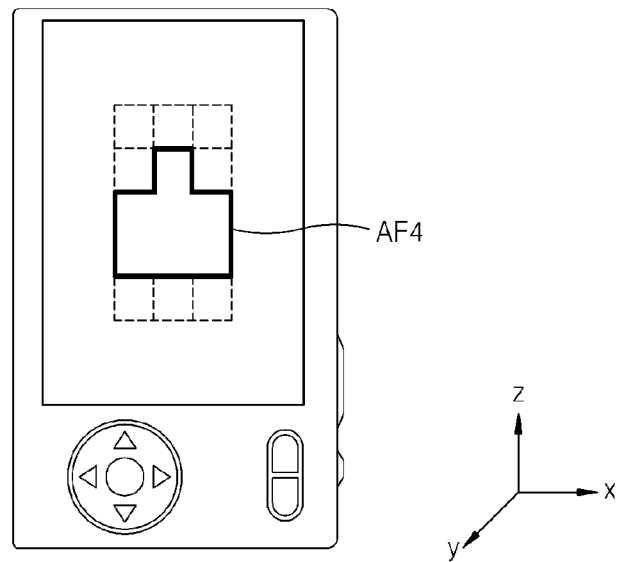

Illustratively, a digital capturing apparatus may be oriented in a horizontal or vertical direction. FIG. 8C illustrates a focus area AF3 of an exemplary digital capturing apparatus oriented vertically with its right side up, and FIG. 8D illustrates a focus area AF4 of the same digital capturing apparatus oriented vertically with its left side up. The right side up orientation denotes a case in which a user points the digital capturing apparatus toward a subject and a power button and/or a shutter release button are/is located on a left side when a display unit is located toward the user and a lens is located toward the subject. The right side is then oriented in a direction (z direction) opposite to that of gravity, and the ground corresponds to an x-y plane. Conversely, the left side up orientation denotes a case that the digital capturing apparatus is arranged in a contrary way to the right side up orientation. As illustrated, in accordance with the herein disclosed apparatus and methods, a focus area may be formed in a shape of which a width of an upper part is always narrow regardless of the orientation of the digital capturing apparatus.

Although a focus area may be formed using a method of summing a plurality of small-sized focus areas in a multi-division focus area in the current embodiment, the invention is not limited to this, and a single small-sized focus area may be configured. For example, a triangle of which an apex is on the top or a trapezoid of which an upper side is shorter than a lower side may be used as a focus area.

Figure 9A:
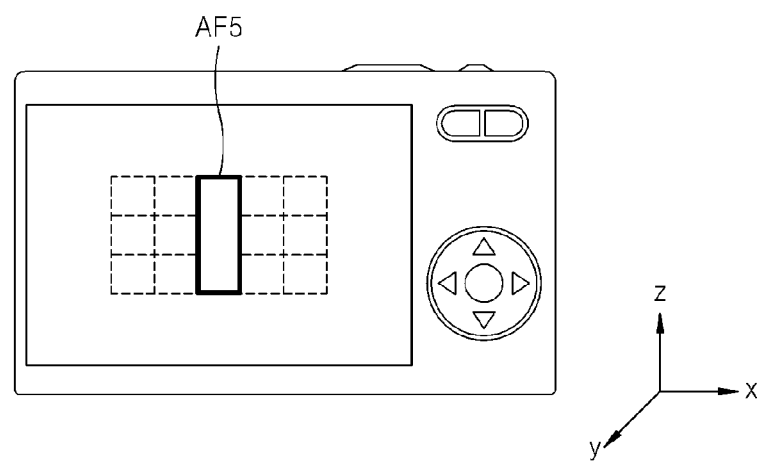
Figure 9B:
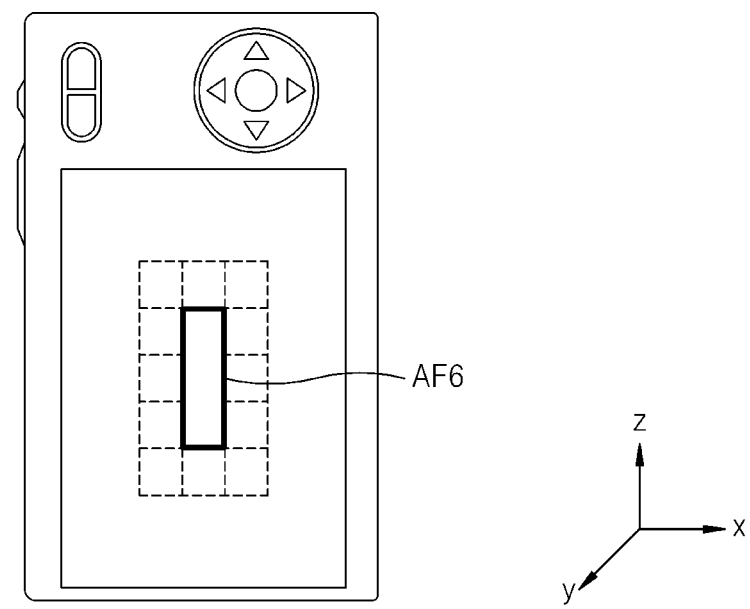

In another embodiment, FIG. 9A illustrates a focus area AF5 having a shape of the letter I. FIG. 9A illustrates the focus area AF5 having the shape of the letter I relative to the ground in the case where a digital capturing apparatus is oriented in the horizontal direction, and FIG. 9B illustrates a focus area AF6 having the shape of the letter I relative to the ground in the case where the digital capturing apparatus is oriented in the vertical direction. As before, the focus area AF5 of which a width of an upper part is narrow may be set regardless of the orientation of the digital capturing apparatus.

Figure 10:
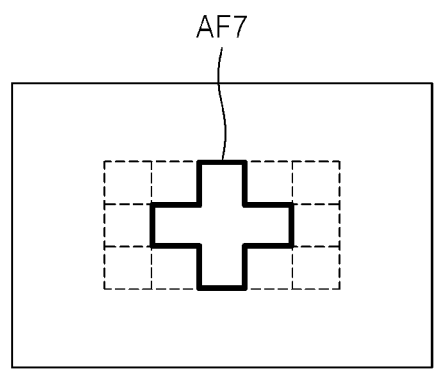

In another embodiment, FIG. 10 illustrates a focus area AF7 having a shape of a cross. In any case where a digital capturing apparatus is arranged in the horizontal or vertical direction, the focus area AF7 having the shape of a cross may have the same shape. Herein, although the shape of a cross is formed with the same width in the horizontal and vertical directions, the widths do not have to be uniform. For example, the width in the horizontal (X) direction may be set wider than that in the vertical (Y) direction.

Figure 11A:
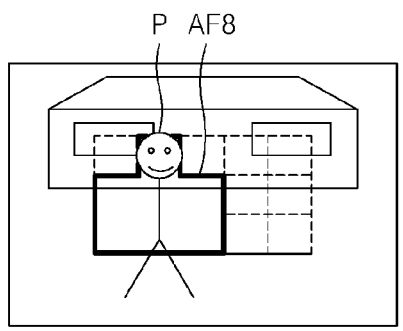
FIGS. 11A and 11B are diagrams illustrating setting a focus area having a shape of which a width of an upper part is narrow.
Figure 11B:
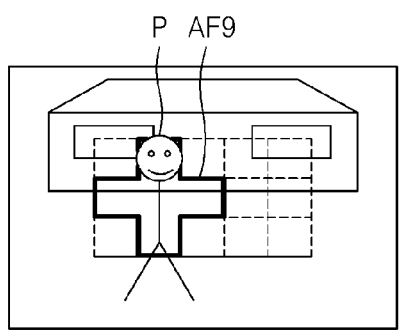

FIGS. 11A and 11B illustrate a position of a focus area moved to the left in case a main subject P such as a person is not in the center of a screen. Referring to FIG. 11A, since the main subject P is arranged in the left of the screen, a focus area AF8 having a shape of which an upper part protrudes may be arranged in the left of the screen. FIG. 11B illustrates a focus area AF9 having a shape of a cross, which is arranged in the left of the screen. To select a position of a focus area, a method of manually selecting the position of a focus area by a user operating a digital capturing apparatus, or a method of automatically selecting the position of a focus area by using a multi-division focus area, may be used. In the case of the manual selection, the position of the focus area may be selected by a touch on a display unit, for example. In the case of the automatic selection, by determining a position of a main subject by using AF evaluation values of focus areas and selecting at least one focus area corresponding to the main subject, an effect of moving a position of a focus area may be realized.

A method of detecting a peak AF evaluation value in an exemplary embodiment will now be described.

Figure 12:
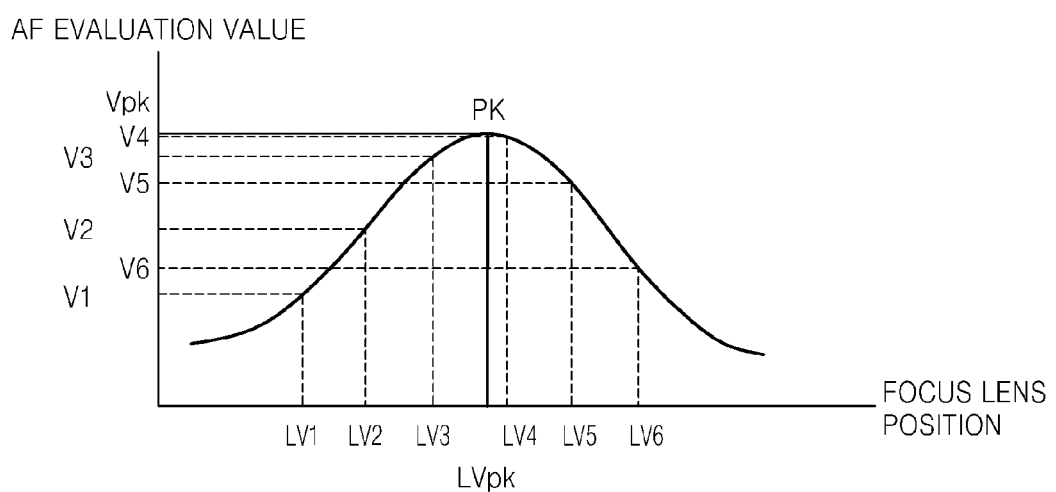
FIG. 12 is a graph illustrating a peak value of an AF evaluation.

FIG. 12 is a graph for use in illustrating determining a peak value from a plurality of AF evaluation values in an exemplary contrast AF method. The peak AF evaluation value may be used to determine an in-focus position in the contrast AF method. In the graph of FIG. 12, the horizontal axis indicates a position of a focus lens at the time when AF is detected, and the vertical axis indicates an AF evaluation value. An AF detection time denotes a time between a charge accumulation start time and a charge accumulation end time in an AF area of an image pickup device. Since AF evaluation values are discrete, a peak value may be determined by performing an interpolation calculation of the AF evaluation values. The actual peak value is a point PK at which an AF evaluation value is Vpk and a focus lens position is LVpk. The interpolation calculation for detecting the peak value may be performed using, for example, three lens positions LV3, LV4, LV5, and three corresponding AF evaluation values V3, V4, and V5.

When a peak AF evaluation value is calculated, the focus lens position corresponding to the peak value may be determined. By doing this, a focus lens may be driven to a position at which the subject is in complete focus.

Focus adjustment will now be described with reference to the attached drawings.

Figure 13:
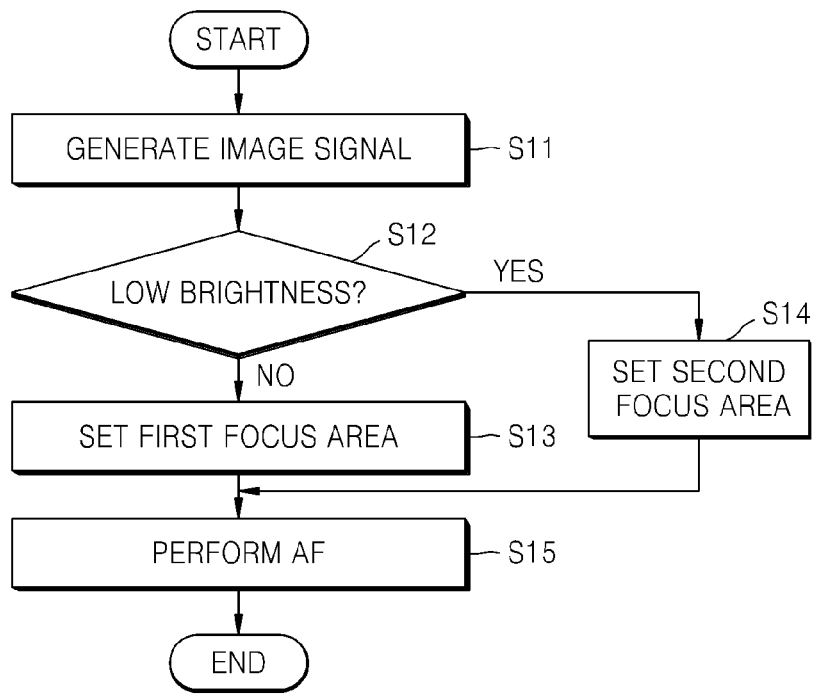
FIG. 13 is a flowchart of a focus adjustment method according to an exemplary embodiment.

FIG. 13 is a flowchart of a focus adjustment method according to an exemplary embodiment.

Referring to FIG. 13, an image signal is generated by converting image light incident on an image pickup device via a focus lens into an electrical signal in step S11. It is determined whether brightness of the image signal is low in step S12. If the brightness of the image signal is not low, a first focus area is set in step S13. However, if the brightness of the image signal is low, a second focus area of which a width of an upper part is narrow is set in step S14. The second focus area may have a size greater than that of the first focus area. In the embodiment, a large size may correspond to a wide area. In step S15, a peak AF evaluation value of an image signal corresponding to the set focus area is calculated, and a position of a focus lens in an in-focus state is controlled according to the peak value.

Although AF adjustment is illustrated in the embodiment, the invention is not limited to this, and a user may manually perform focus adjustment on the set second focus area of which a width of an upper part is narrow.

Figure 14:
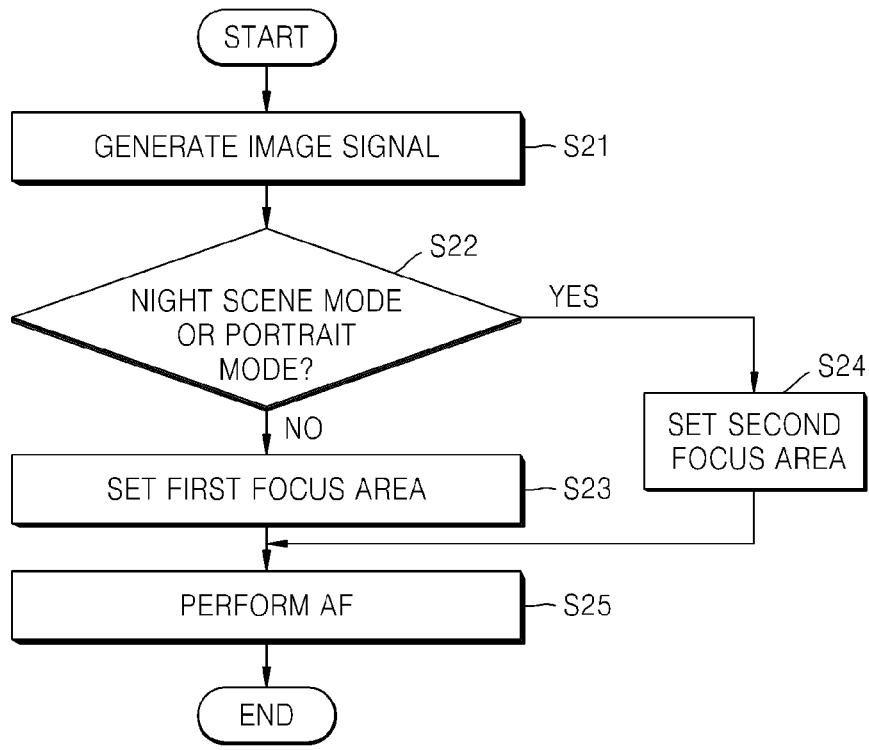
FIG. 14 is a flowchart of a focus adjustment method according to another exemplary embodiment.

FIG. 14 is a flowchart of a focus adjustment method according to another exemplary embodiment.

Referring to FIG. 14, an image signal is generated by converting image light incident on an image pickup device via a focus lens to an electrical signal in step S21. It is determined whether a current mode is a night scene mode and/or a portrait mode in step S22. If the current mode is neither the night scene mode nor the portrait mode, a first focus area is set in step S23. However, if the current mode is at least one of the night scene mode and the portrait mode, a second focus area of which a width of an upper part is narrow is set in step S24. The second focus area may have a size greater than that of the first focus area. In the embodiment, a large size may correspond to a wide area. In step S25, a peak AF evaluation value of an image signal corresponding to the set focus area is calculated, and a position of a focus lens in an in-focus state is controlled according to the peak value.

Although only the night scene mode and the portrait mode are illustrated in the embodiment, the invention is not limited to this, and a focus area to be set may be changed according to other various modes. For example, a focus area of which a width of an upper part is narrow can also be set in a moving picture mode.

In addition, although AF adjustment is illustrated in the embodiment, the invention is not limited to this, and a user may manually perform focus adjustment on the set second focus area of which a width of an upper part is narrow.

Figure 15:
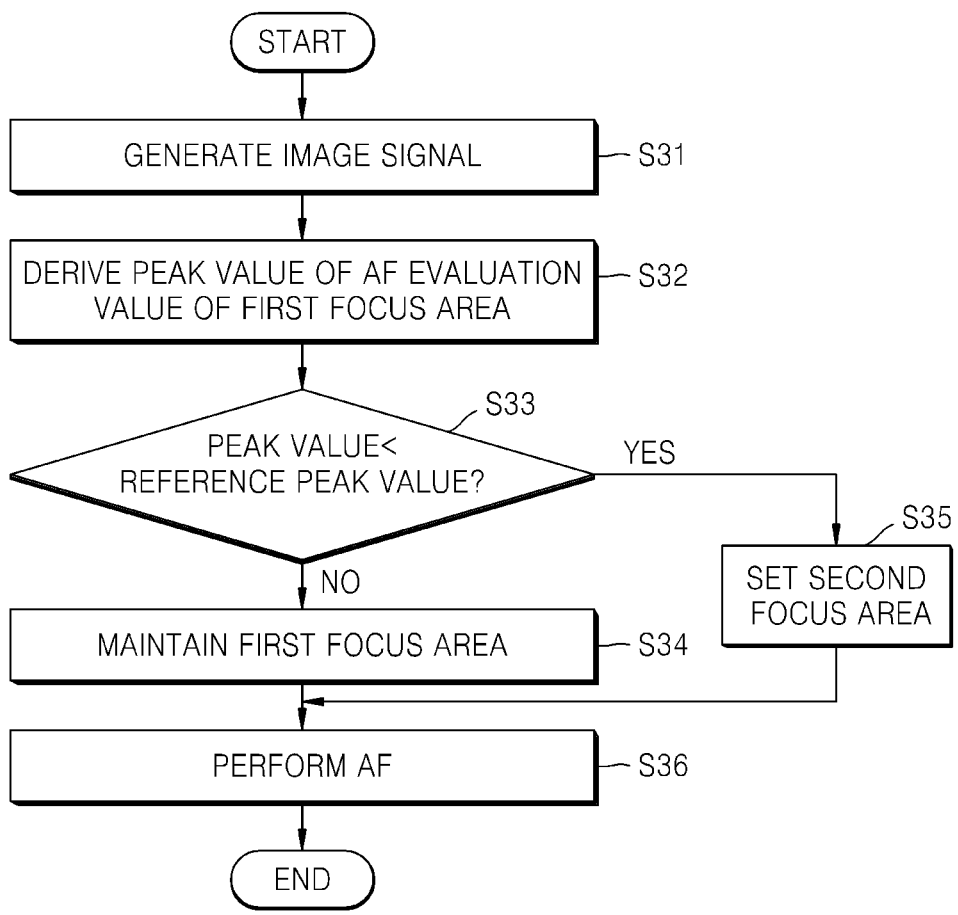
FIG. 15 is a flowchart of a focus adjustment method according to another exemplary embodiment.

FIG. 15 is a flowchart of a focus adjustment method according to another exemplary embodiment.

Referring to FIG. 15, an image signal is generated by converting image light incident on an image pickup device via a focus lens to an electrical signal in step S31. A peak AF evaluation value is derived from an image signal corresponding to a first focus area in step S32. The peak AF evaluation value is compared to a reference peak value in step S33. If the peak AF evaluation value is not less than the reference peak value, the first focus area is set in step S34. However, if the peak AF evaluation value is less than the reference peak value, a second focus area of which a width of an upper part is narrow is set in step S35. The second focus area may have a size greater than that of the first focus area. In the present invention, a large size may correspond to a wide area. In step S36, a peak AF evaluation value based on an image signal corresponding to the set focus area is calculated, and a position of a focus lens in an in-focus state is controlled according to the peak value. Although AF adjustment on the set focus area is illustrated in the embodiment, the invention is not limited to this, and a user may manually perform focus adjustment on the set focus area.

Figure 16:
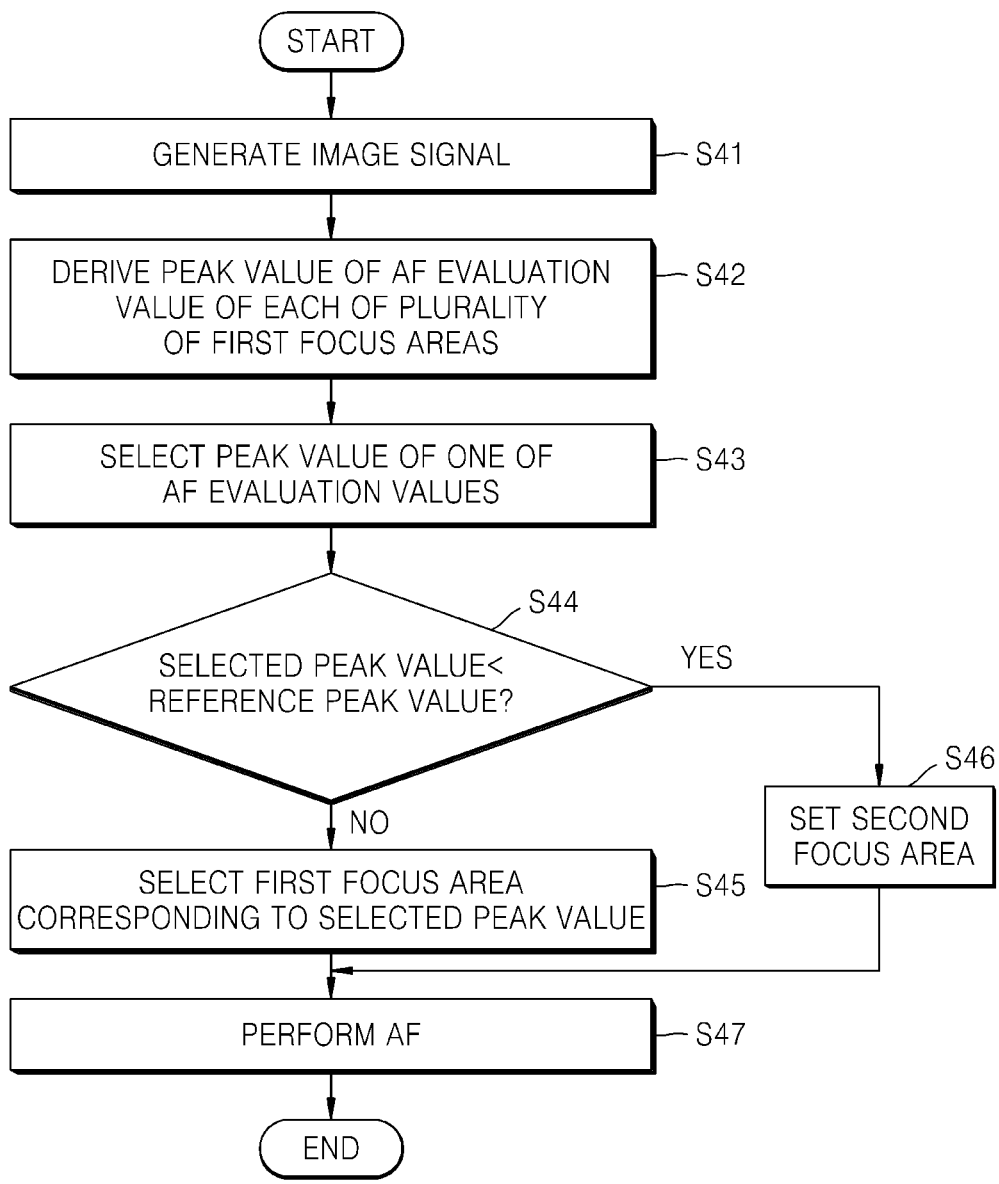
FIG. 16 is a flowchart of a focus adjustment method according to another exemplary embodiment.

FIG. 16 is a flowchart of a focus adjustment method according to another exemplary embodiment.

Referring to FIG. 16, an image signal is generated by converting image light incident on an image pickup device via a focus lens to an electrical signal in step S41. Peak AF evaluation values respectively corresponding to a plurality of first focus areas including at least one area of a captured scene corresponding to the image signal are derived using image signals respectively corresponding to the plurality of first focus areas in step S42. A greatest one of the peak AF evaluation values respectively corresponding to the plurality of first focus areas is selected in step S43. The subject corresponding to the selected peak value may be determined as a main subject.

It is determined in step S44 whether the selected peak value is less than a reference peak value. If the selected peak value is not less than the reference peak value, a first focus area corresponding to the selected peak value is selected and determined, in step S45. However, if the selected peak value is less than the reference peak value, a second focus area, which is greater than the first focus area and has a shape of which a width of an upper part is narrow, is set in step S46. The second focus area may include the first focus area corresponding to the selected peak value. In step S47, AF adjustment on the set focus area is performed. Although AF adjustment on the set focus area is illustrated in the embodiment, the invention is not limited to this, and a user may manually perform focus adjustment on the set focus area.

Various embodiments of performing an AF operation using an AF (auto focus) evaluation value and an AE (auto exposure) evaluation value will now be described. In the embodiments described hereinafter, the AF operation is described by assuming that a focus adjustment apparatus of a camera is the digital capturing apparatus 1 equipped with the lens 100 illustrated in FIG. 1.

Figure 17:
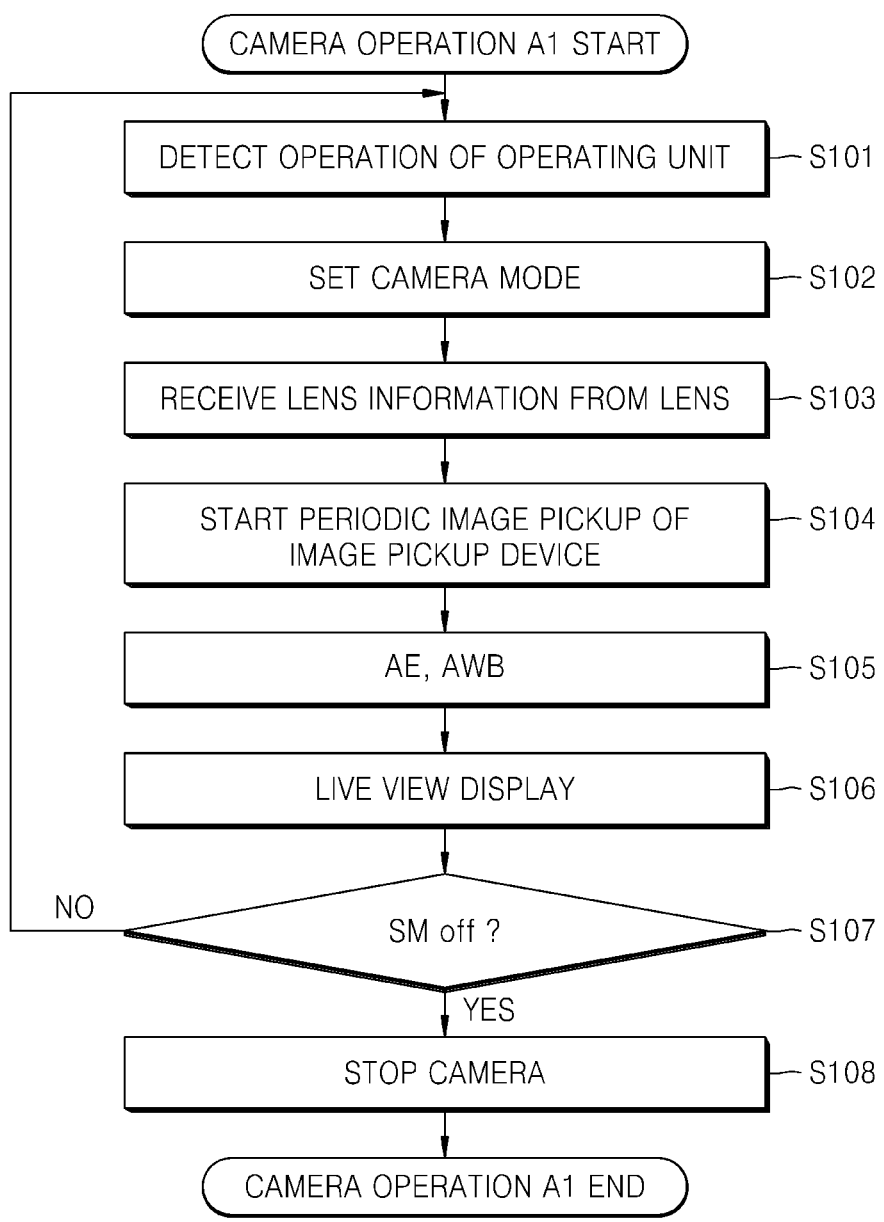
FIG. 17 is a flowchart of an operation of a digital camera equipped with focus adjustment apparatus, according to an exemplary embodiment.

FIG. 17 is a flowchart of an illustrative operation of an exemplary digital camera equipped with the focus adjustment apparatus, according to an embodiment.

Referring to FIG. 17, a camera operation A1 starts by a user activating a main switch SM of the digital camera, for example, using operating unit 207. In step S101, an operation of the operating unit 207 is detected. An operation of a mode dial of operating unit 207 is also detected, and a capturing mode based thereon for capturing a still image or a moving picture is set in step S102. Lens information needed to operate the digital camera is received from the lens 100 in step S103. For example, the lens information may include information needed to control AF, AE, AWB, and image quality as parameters unique to each lens, which may be stored in a lens memory of a lens controller of each lens, for example. The image pickup device 204 starts picking up an image periodically in step S104. In step S105, an AE calculation is performed by performing light measuring, and an AWB calculation is performed. In step S106, a live view display is performed. Although steps S104 to S106 are illustrated being performed sequentially, steps S104 to S106 may be simultaneously performed while receiving image information from the image pickup device 204. It is determined in step S107 whether the main switch SM is turned off. If the main switch SM is not turned off, the process returns to step S101, and the live view display operation is repeated. However, if the main switch SM is turned off, the camera operation A1 ends by disabling the digital camera, S108.

In the illustrative embodiment, while performing the live view display, if an S1 state is enabled (ON), such as by pressing the shutter release button halfway, an S1 operation A2 is performed. This will now be described in more detail with reference to FIG. 18.

Figure 18:
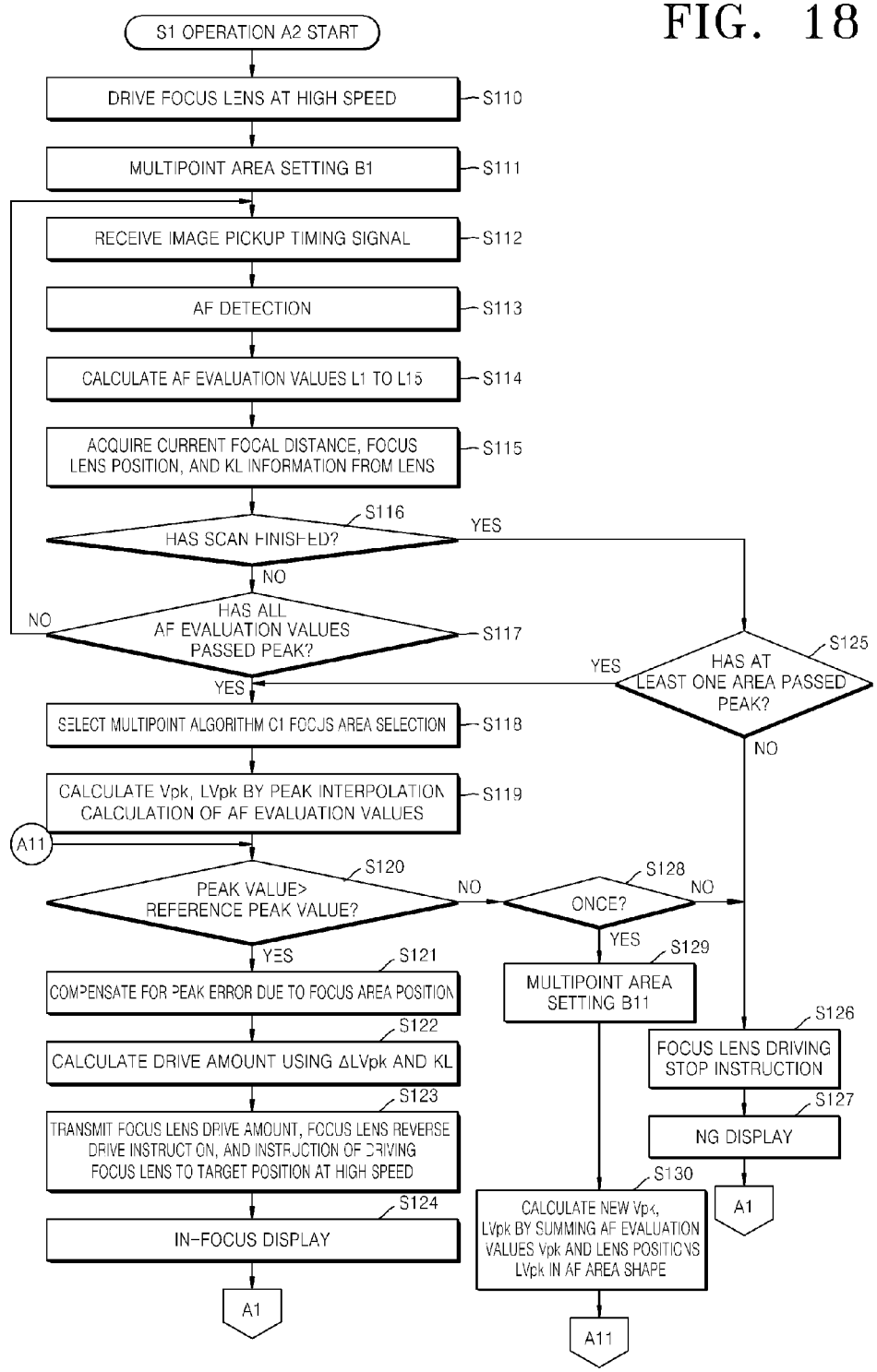
FIG. 18 is a flowchart of an exemplary method in the operation of the digital camera of FIG. 17.

Referring to FIG. 18, the S1 operation A2 starts. An instruction to drive the focus lens 104 at a high speed is output from the lens controller 110 in step S110. A lens control circuit of the lens controller 110 drives the focus lens 104 at a constant speed to perform contrast AF.

Processing of a multipoint area setting subroutine B1 is performed in step S111. In the multipoint area setting subroutine B1, which will be described in more detail hereinafter, focus areas are determined according to a condition.

An image pickup timing signal is received in step S112. The image pickup timing signal is for the timing of starting AF detection and may be generated based on position setting of the focus areas. The AF detection is performed in response to the image pickup timing signal in step S113. An image pickup timing is obtained by counting, by the CPU 224 via the pre-processing unit 220, a driving signal generated by the image pickup device controller (CIS control circuit) 205, and if a predetermined count is obtained, it is determined that it is the timing of starting AF detection. That is, the timing of starting AF detection is a timing corresponding to a focus area position at the time delayed a predetermined time from the charge accumulation start time.

In step S113, AF detection of horizontal scanning lines is performed by transmitting images of the focus areas from the image pickup device controller (CIS control circuit) 205 to an AF detection circuit of the pre-processing unit 220 included in the camera controller 209. In step S114, AF evaluation values L1 to L15 of the focus areas are calculated.

In step S115, a current focal distance from the lens 100, a position of the focus lens 104 at an AF detection timing, a focus lens drive amount of a current image pickup lens, and a conversion coefficient KL of a focus deviation amount are obtained, and the obtained data and the AF evaluation values L1 to L15 are stored as a set.

In step S116, it is determined whether the focus lens 104 has finished scanning to the end. If the focus lens 104 has not finished scanning to the end, it is determined in step S117 whether all of the AF evaluation values L1 to L15 have passed a peak. If all of the AF evaluation values L1 to L15 have not passed the peak, this process returns to step S112, and the AF operation is continuously performed.

There may be a case where the focus lens 104 arrives at the end without any AF evaluation value passing the peak during the AF operation. Thus, it is determined in step S116 whether the focus lens 104 has finished scanning to the end, and if the focus lens 104 has finished scanning to the end, it is determined in step S125 whether at least one focus area has passed the peak. If at least one focus area has passed the peak, the process proceeds to step S118 to perform ordinary AF processing. If no focus area has passed the peak, it is determined that contrast is low, i.e., AF was not successful, and a focus lens driving stop instruction is output in step S126. In step S127, the AF operation ends by performing a no good (NG) display of AF. Thereafter, this process returns to the camera operation A1 illustrated in FIG. 17 to repeat the live view display.

In a case where the AF operation continuously proceeds, a multipoint method subroutine C1 is performed in step S118. Here, a main subject is determined by a multipoint method using AF evaluation values calculated from multi-divided focus areas. For example, a focus area indicating that a peak position of an AF evaluation value is closest to the camera may be selected. However, when a current magnification is greater than a predetermined magnification, by selecting a focus area in the center, a main subject selection method having a higher focusing probability may be obtained. The multipoint method subroutine C1 will be described hereinafter in more detail.

In step S119, an actual peak value Vpk and lens position LVpk are derived from AF evaluation values L using an interpolation calculation. It is determined in step S120 whether the actual peak value Vpk calculated by the interpolation calculation from the AF evaluation values L is greater than a reference peak value. If the actual peak value Vpk is greater than the reference peak value, it is determined that AF is possible, a compensation coefficient of a compensation value is received from the lens 100, and a peak error due to a position of the focus area is compensated for in step S121. A compensation value ΔIBoff of an error ΔIB according to a frequency difference between the lens 100 and the AF detection varies according to a focus area position. Thus, the peak error compensation may be performed by selecting the compensation value ΔIBoff corresponding to the selected focus area. A unit is a defocus amount, μm.

In step S122, a focus lens drive amount is calculated by multiplying a focus lens drive amount ΔLVpk obtained in step S119 by a conversion coefficient KL of a focus deviation amount. Herein, the conversion coefficient KL closest to the position LVpk is used.

In step S123, lens reverse driving starts by transmitting the focus lens drive amount, a focus lens reverse drive instruction, and an instruction of driving the focus lens 104 to a target position at a high speed from the camera controller 209 to the lens controller 110. Focusing is performed by driving the focus lens 204 toward a lens target position calculated in step S119. In step S124, the AF operation ends by performing an in-focus display for a predetermined time. Thereafter, this process returns to the camera operation A1 illustrated in FIG. 17 to repeat the live view display.

If it is determined in step S120 that the actual peak value Vpk calculated by the interpolation calculation of the AF evaluation values L is equal to or less than the reference peak value PKT, it is determined in step S128 whether the determination is performed for the first time. If the determination is performed for the first time, a multipoint area setting subroutine B11 is performed in step S129. That is, if the determination is performed for the first time, focus detection is performed for each of the 15 multi-divided focus areas, and if no AF evaluation value may be obtained, a large-scaled focus area is replaced in step S129. Vpk and LVpk are newly derived by summing AF evaluation values Vpk and focus lens positions LVpk in an AF area shape, respectively, in step S130. Thereafter, the operation returns to step S120. AF evaluation values are newly derived from the large-scaled focus area. A peak AF evaluation value is changed to a value based on the large-scaled focus area. It is determined that the AF detection is possible, and AF is continuously performed. If the AF detection is still not successful, an NG process is performed.

In the illustrative embodiment, if the shutter release button is fully pressed while performing the live view display after AF completion, an S2 operation A3 is enabled (ON). The S2 operation A3 will now be described with reference to FIGS. 19A and 19B.

Figure 19A:
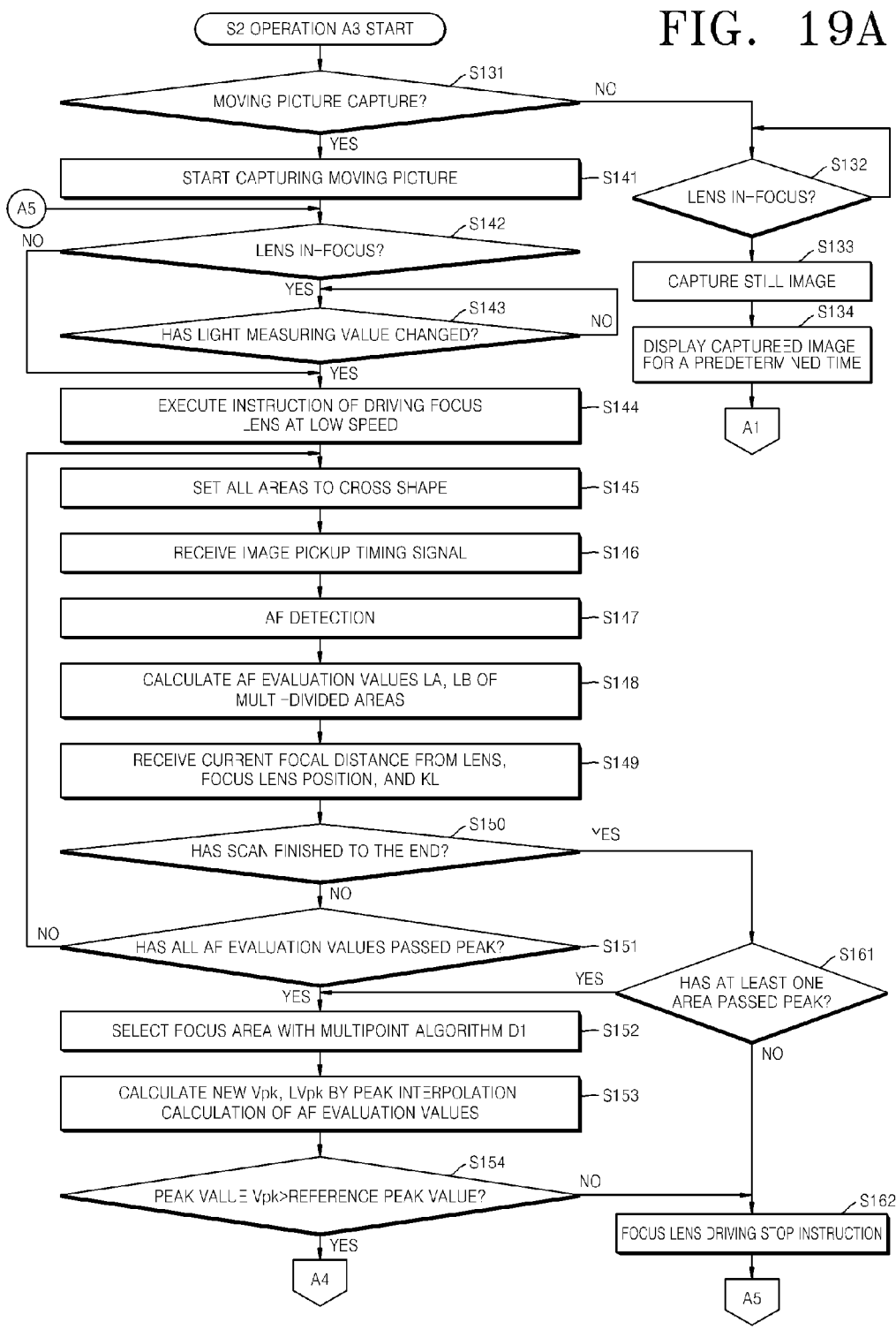
FIGS. 19A and 19B are flowcharts of an exemplary method in the operation of the digital camera of FIG. 17.

Referring to FIG. 19A, the S2 operation A3 starts. In step S131, it is determined whether a current mode is a moving picture capturing mode. If not, the current mode is the still image mode, and it is determined in step S132 whether the focus lens 104 is in an in-focus state. If the S2 operation A3 is enabled (ON) before in-focus is completed, the progress of S2 operation A3 is delayed until focusing is completed. After the focus lens 104 is in the in-focus state, a still image is captured in step S133. The captured image may be displayed for a predetermined time in step S134. This process may then store the captured image, and return to the camera operation A1 illustrated in FIG. 17 to repeat the live view display.

However, if the current mode is the moving picture capturing mode, capturing a moving picture starts in step S141 by beginning exposure for a moving picture. The exposure is continued until the S2 operation A3 is disabled (OFF). In step S142, it is determined whether the focus lens 104 is in the in-focus state. If the focus lens 104 is in the in-focus state, it is determined in step S143 whether a light measuring value has been changed, and subsequent AF starts. After in-focus, when the light measuring value is changed, AF is performed. If it is determined in step S142 that the focus lens 104 is in the in-focus state, this process proceeds to the next step immediately. This is for smoothly performing continuous AF operations while capturing the moving picture.

In step S144, an instruction of driving the focus lens 104 at a low speed is executed. When capturing a moving picture, a change to low speed driving is performed. The lens controller 110 drives the focus lens 104 at a constant speed lower than that of ordinary AF to perform the contrast AF because it is easier to enjoy a moving picture captured with a low speed control.

A focus area may be changed to a larger-sized focus area than a focus area of AF in the S1 operation. Illustratively, in the embodiment, the focus area having the shape of a cross illustrated in FIG. 10 and a focus area including all of the 15-divided areas are used in step S145. An image pickup timing signal for all of the focus areas is received in step S146. The image pickup timing signal is for the timing of starting AF detection and is generated based on position setting of the focus areas. A driving signal generated by the image pickup device controller (CIS control circuit) 205 is counted by the CPU 224 via the pre-processing unit 220, and if a predetermined number of counts is counted, it is determined that it is the timing of starting AF detection. That is, the timing of starting AF detection is a timing corresponding to a focus area position at the time delayed a predetermined time from the charge accumulation start time.

In step S147, AF detection of horizontal scanning lines is performed by transmitting images of the focus areas from the image pickup device 204 to the AF detection circuit of the pre-processing unit 220 included in the camera controller 209. In step S148, AF evaluation values LA and LB of the focus area having the shape of a cross and the focus area including all of the 15-divided areas are calculated, respectively. The focus area has a structure of summing the 15-divided areas illustrated with the cross and dash lines in FIG. 10.

In step S149, a current focal distance from the lens 100, a position of the focus lens 104 at an AF detection timing, a current focus lens drive amount, and a conversion coefficient KL of a focus deviation amount are obtained, and the obtained data and the AF evaluation values LA and LB are stored as a set.

In step S150, it is determined whether the focus lens 104 has finished scanning to the end. If the focus lens 104 has not finished scanning to the end, it is determined in step S151 whether the AF evaluation values LA and LB have passed a peak. If the AF evaluation values LA and LB have not passed the peak, this process returns to step S145, and the AF operation is continuously performed. However, if the focus lens 104 arrives at the end without any AF evaluation value passing the peak during the AF operation, it is determined that the focus lens 104 has finished scanning to the end, and it is determined in step S161 whether at least one focus area has passed the peak. If at least one focus area has passed the peak, this process proceeds to step S152 to perform ordinary AF processing. If at least one focus area has not passed the peak, it is determined that there has not been a peak, and it is determined that a contrast is low, i.e., AF was not successful, and a focus lens driving stop instruction is transmitted to the lens 100 in step S162. Thereafter, this process returns to step S142 to repeat AF.

In a case where the AF operation continuously proceeds, i.e., in a case where all of the AF evaluation values have passed the peak, a multipoint method subroutine D1 is performed in step S152. Here, a main subject is determined by the multipoint method D1 by using an AF evaluation value of multi division focus areas. In the current embodiment, a cross shape or an entire area of multi-divided focus areas may be selected. In an illustrative operation, the cross shape or the entire focus area is selected. The multipoint method D1 will be described hereinafter in more detail.

In step S153, an actual peak value Vpk and a lens position LVpk of AF evaluation values L of a selected focus area are derived using an interpolation calculation. It is determined in step S154 whether the actual peak value Vpk calculated by the interpolation calculation of the AF evaluation values L is greater than a reference peak value. If the actual peak value Vpk is not greater than the reference peak value, it is determined that AF was not successful, a focus lens driving stop instruction is transmitted to the lens 100 in step S162, and the method proceeds from there. However, if the actual peak value Vpk is greater than the reference peak value, it is determined that AF is possible, and the method proceeds to step S155 of FIG. 19B, where a peak error due to a position of the focus area is compensated for.

Figure 19B:
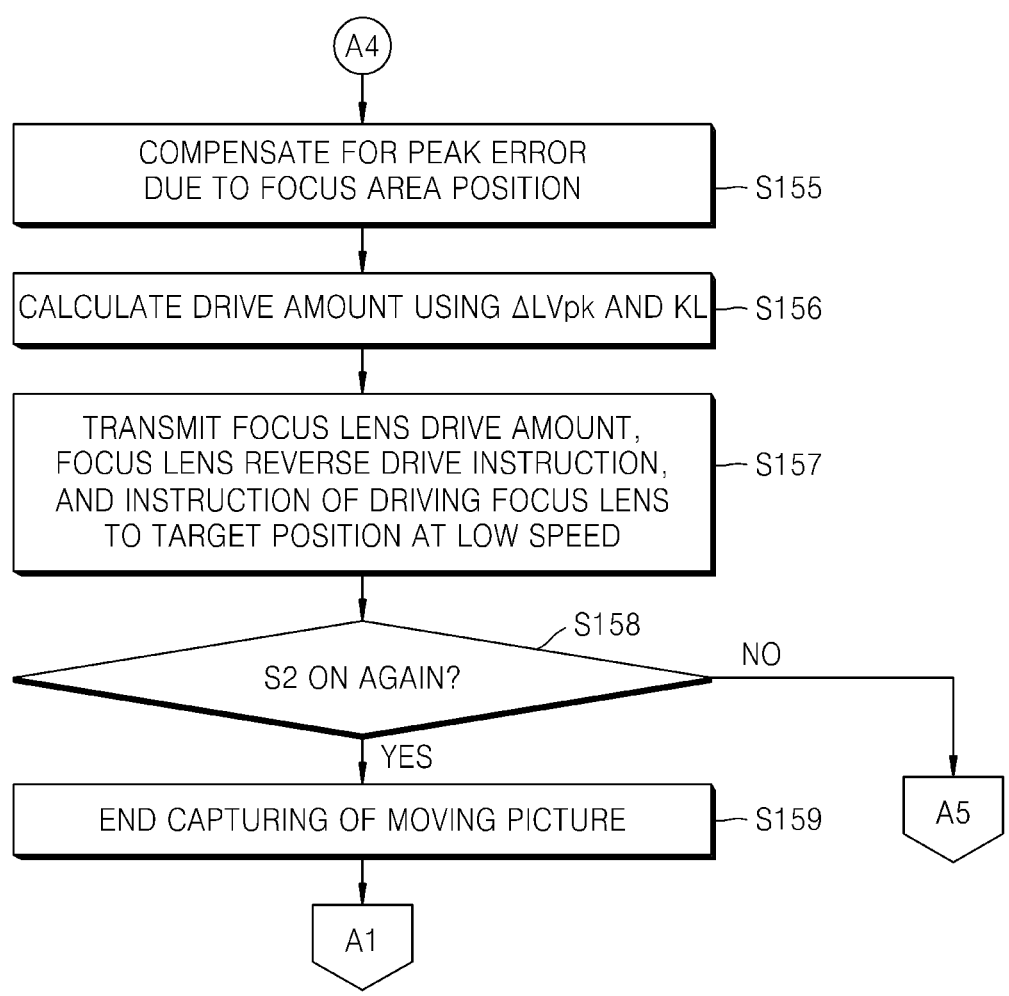

Referring to, FIG. 19B, the same compensation as the compensation of ΔIBoff and ΔIB in the S1 operation is performed. In step S156, a compensation amount of a focus lens drive amount is calculated by multiplying a focus lens drive amount ΔLVpk by a conversion coefficient KL of a focus deviation amount. In step S157, the focus lens drive amount, a focus lens reverse drive instruction, and an instruction of driving the focus lens 104 to a target position at a low speed are transmitted to the lens 100. The lens 100 starts reverse driving and performs AF by driving the focus lens 104 toward a target position of the focus lens 104, which is calculated in step S153. In the illustrative embodiment, it is determined in step S158 whether the S2 operation is enabled (ON) again, or disabled (OFF). If the shutter release button is not operated, the method returns to step S142 of FIG. 19A, and the moving picture capturing and AF are continuously performed. If the shutter release button is not pressed again after the shutter release button has been fully pressed, the moving picture capturing ends in step S159. Thereafter, this process returns to the camera operation A1 illustrated in FIG. 17 to repeat the live view display.

Figure 20:
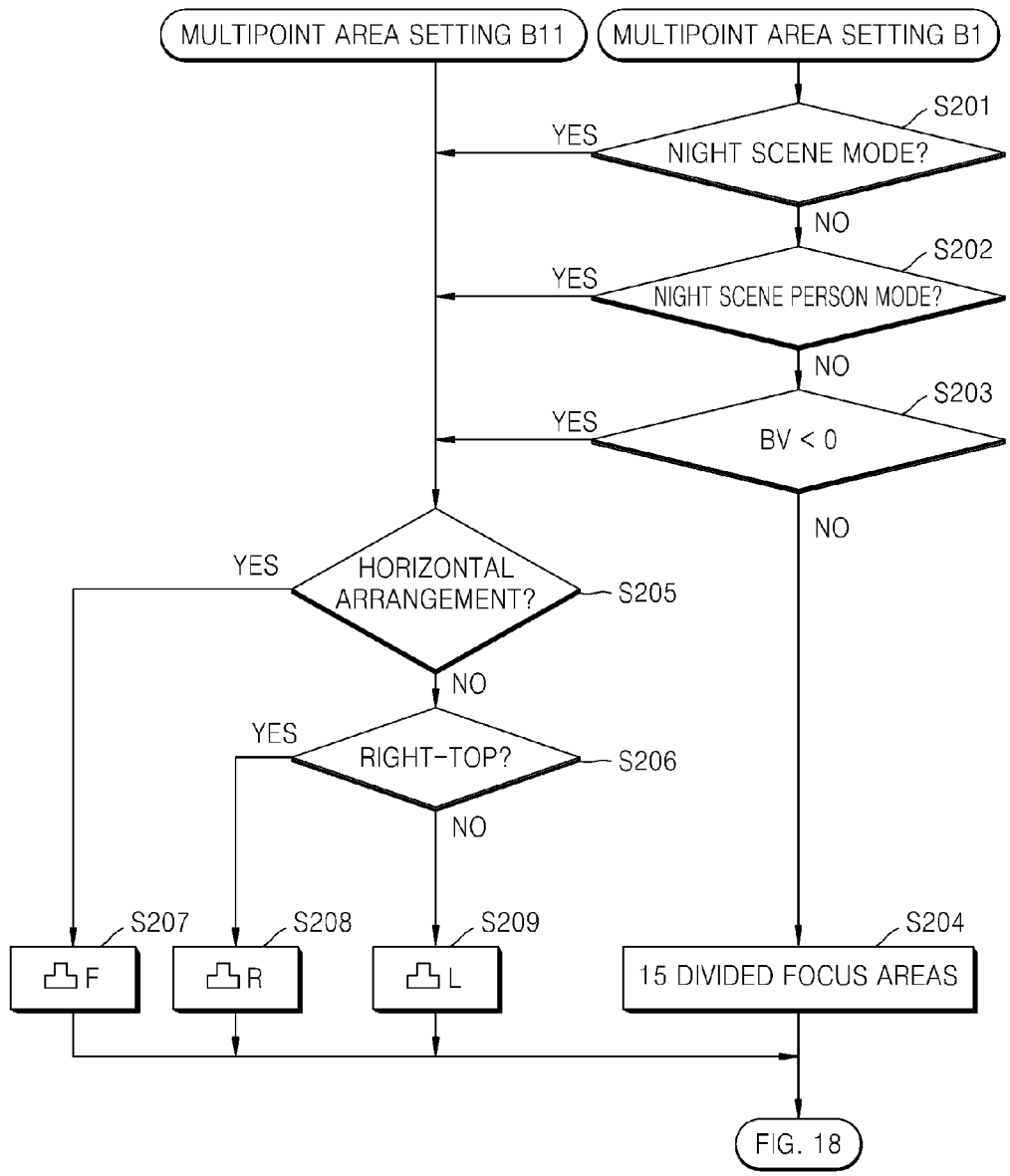
FIGS. 20 to 23 are flowcharts of exemplary methods of setting a focus area in the operation of the digital camera of FIG. 18.

FIG. 20 is a flowchart of an operation of setting a focus area in the digital camera whose operation is illustrated in FIG. 18, according to an exemplary embodiment of the present invention. In detail, multipoint area setting subroutines B1 and B11 are illustrated.

Referring to FIG. 20, there are two starting points. In the case of B1, it is determined in step S201 whether the camera is in the night scene mode. If the camera is in the night scene mode, this process proceeds to step S205. Otherwise, if the camera is not in the night scene mode, it is determined in step S202 whether the camera is in a night scene person mode. If the camera is in the night scene person mode, this process proceeds to step S205. The night scene person mode means a mode related to a night scene. These modes are information from step S102 of FIG. 17. It is determined whether brightness BV of an image signal is low brightness. In detail, it is determined in step S203 whether the brightness BV is less than 0. The brightness BV may be obtained from multi division light measuring illustrated in FIG. 6B. According to the light measuring value, if brightness of a subject is low, this process proceeds to step S205. If none of the determinations are satisfied, this process proceeds to step S204. By setting 15 multi-divided focus areas, focusing is examined for each of the small-sized focus areas (corresponding to first focus areas), and this process returns to FIG. 18.

In the case of B11 starting from step S205, in steps S205 and S206, a camera orientation is determined. If the camera is oriented in the horizontal direction, a focus area (corresponding to FIG. 8A) having a shape of which an upper part protrudes in a direction opposite to that of gravity is set in step S207. Illustratively, the horizontal arrangement may denote that a power button and/or a shutter release button are/is located at the uppermost part or the lowest part relative the ground or that a horizontal side of the display unit 206 is longer than a vertical side thereof. Vertical orientation may denote that the horizontal orientation is perpendicularly rotated by 90°. If the camera is in a vertical orientation corresponding to the right side up, the method proceeds to step S208. A second focus area (corresponding to FIG. 8C) having a shape of which an upper part protrudes in the right direction of the camera, i.e., the right direction in which the power button or the shutter release button is disposed, is set. The second focus area is greater than the first focus area and has the protruded shape described above. If the camera is in a vertical orientation corresponding to the left side up, the method proceeds to step S209. A second focus area (corresponding to FIG. 8D) having a shape of which an upper part protrudes in the opposite direction to the direction in step S208 is set. Thereafter, this process returns to FIG. 18. Although the shape of which an upper part protrudes in a direction opposite to that of gravity is illustrated, the present invention is not limited to this, and various other shapes such as a triangle protrusion pattern may be used.

Figure 21:
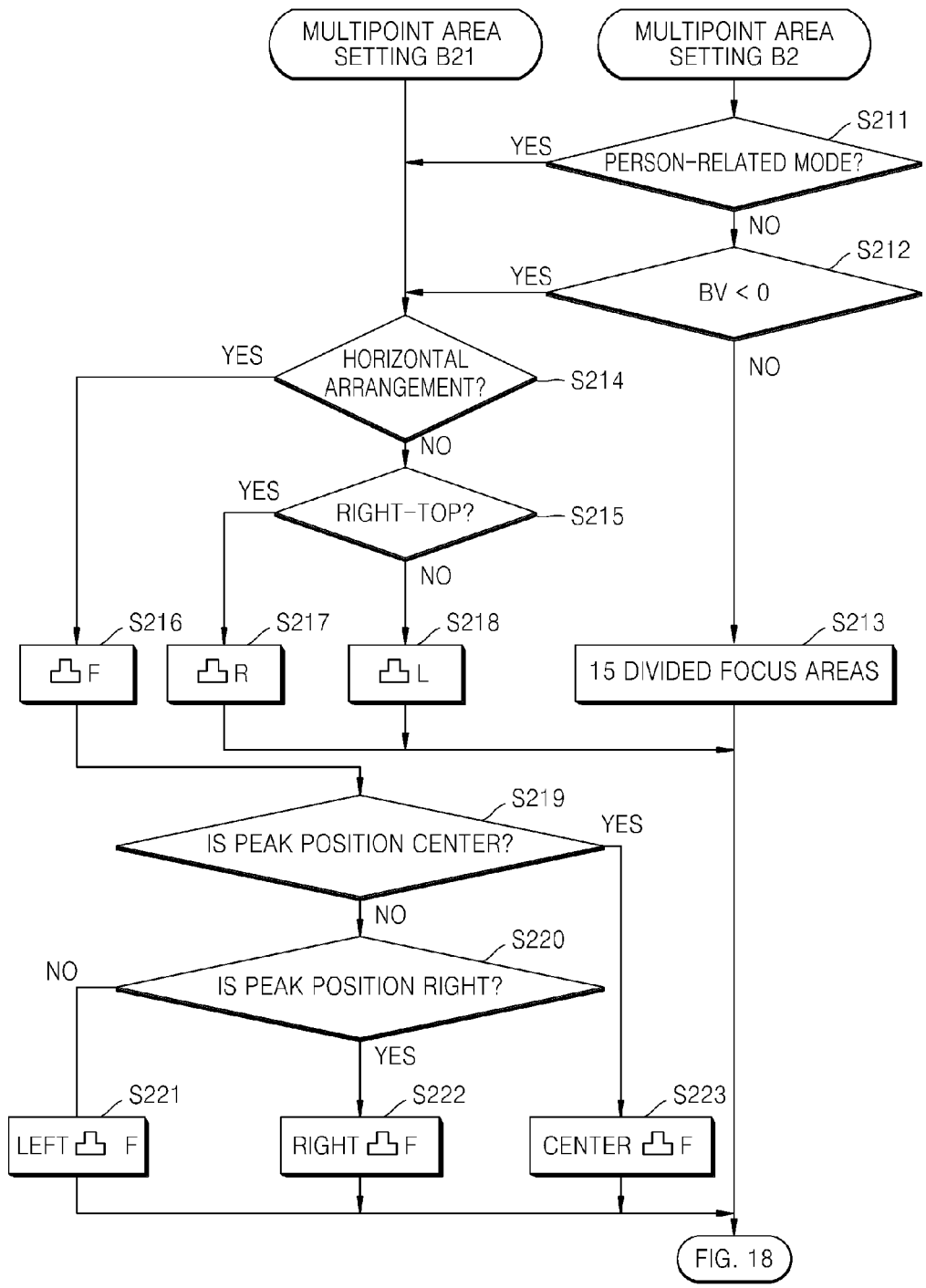

FIG. 21 is a flowchart of a method of setting a focus area in the digital camera whose operation is illustrated in FIG. 18, according to another exemplary embodiment of the present invention. In the embodiment, B1 and B11 of FIG. 18 may be replaced with B2 and B21, respectively, as another embodiment of the multipoint area setting subroutines.

Referring to FIG. 21, as before there are two starting points. In the case of B2, it is determined in step S211 whether the camera is in a person-related mode. If the camera is in a person-related mode, the method proceeds to step S214. Person-related modes may include a reverse light person mode, a night scene person mode, and/or a souvenir photograph mode. The mode information may be obtained from step S102 of FIG. 17. It is determined in step S212 whether brightness BV of an image signal is low brightness. In detail, it is determined whether the brightness BV is less than 0. The brightness information may be obtained from the multi division light measuring illustrated in FIG. 6B. According to the light measuring value, if brightness of a subject is low, the method proceeds to step S214. If none of the determinations of steps S211 and S212 are satisfied, the method proceeds to step S213. In step S213, focusing is examined for each of small-sized focus areas (corresponding to first focus areas) that are 15 multi-divided focus areas, and the method returns to FIG. 18.

In the case of B21, starting from step S214, in steps S214 and S215, a camera orientation is determined. If the camera is oriented in the horizontal direction, a focus area having a shape of which an upper part of the camera protrudes is set in step S216. If the camera is in the vertical orientation corresponding to the right side up, a second focus area having a shape of which an upper part protrudes in the right direction of the camera is set in step S217. If the camera is in the vertical orientation corresponding to the left side up, a second focus area having a shape of which an upper part protrudes in the left direction of the camera is set in step S218. The second focus area is greater than the first focus area and has the protruded shape described above.

A position of a main subject is determined in steps S219 and S220. By analyzing a peak AF evaluation value of each of the 15 divided focus areas, if a peak position of the focus areas is in the center area, the method proceeds to step S223. Thus, a second focus area having a shape of which an upper part protrudes in the upper direction of the camera is disposed in the center area of the 15 divided focus areas. If the peak position of the focus areas is in the left area, the method proceeds to step S221. If the peak position of the focus areas is in the right area, a second focus area having a shape of which an upper part protrudes in the upper direction of the camera is disposed in the right area of the 15 divided focus areas in step S222. FIG. 11B illustrates that the second focus area is disposed in the left area.

Figure 22:
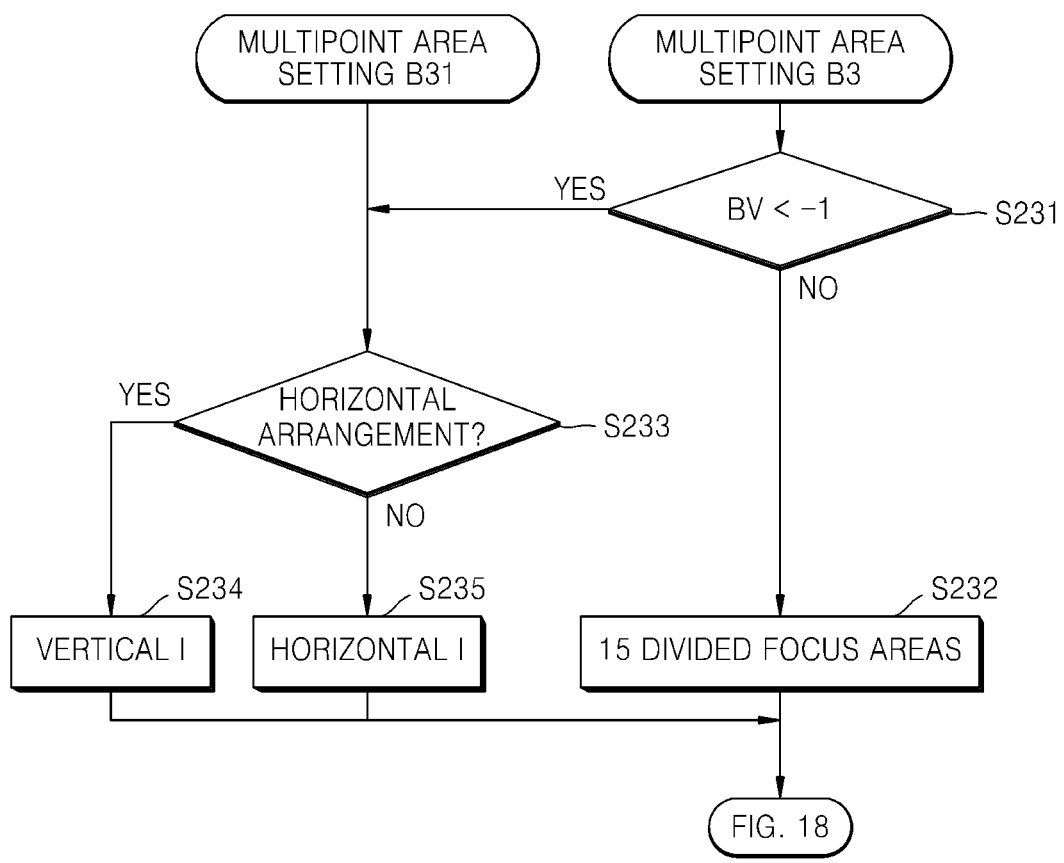

FIG. 22 is a flowchart of a method of setting a focus area in the digital camera whose operation is illustrated in FIG. 18, according to another exemplary embodiment. In the embodiment, B1 and B11 of FIG. 18 may be replaced with B3 and B31, respectively, as another embodiment of the multipoint area setting subroutines.

Referring to FIG. 22, there are two starting points. In the case of B3, it is determined in step S231 whether brightness BV of an image signal is low brightness. For example, it may be determined whether the brightness BV is less than −1. The brightness information may be obtained from the multi division light measuring illustrated in FIG. 6B. According to the light measuring value, if brightness of a subject is low, the method proceeds to step S233. However, if the brightness of the subject is not low, in step S232, 15 multi-divided focus areas are set and focusing is examined for each of the small-sized focus areas (corresponding to first focus areas), and the method returns to FIG. 18 to perform AF.

In the case of B31, starting from step S233, a camera orientation is determined in step S233. If the camera is oriented in the horizontal direction, a focus area having a shape of I (corresponding to FIG. 9A) in the vertical direction is set in step S234. If the camera is in the vertical orientation, a second focus area having a shape of I (corresponding to FIG. 9B) in the horizontal direction is set in step S235, and this process returns to FIG. 18. The second focus area is greater than the first focus area.

Figure 23:
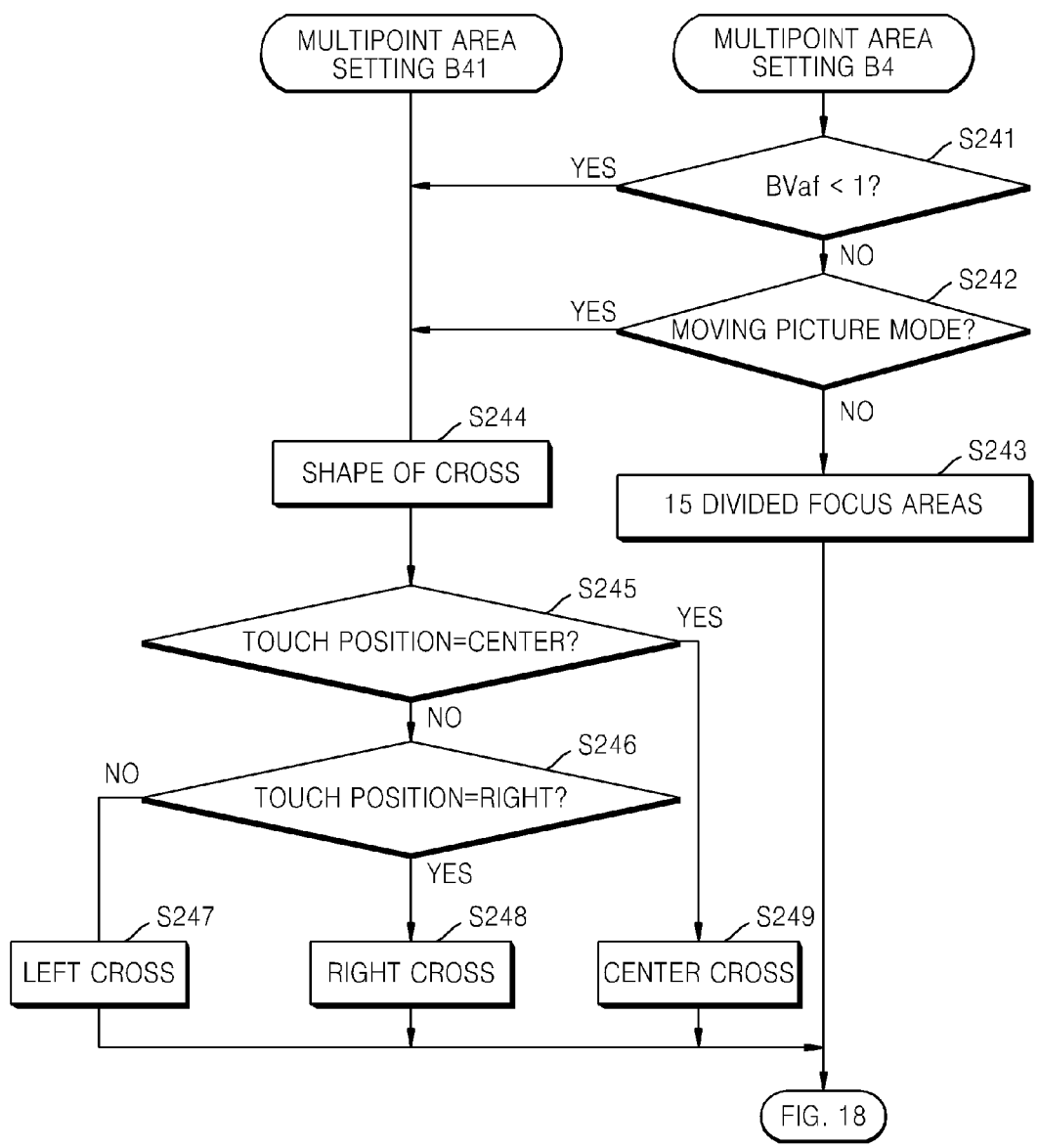

FIG. 23 is a flowchart of a method of setting a focus area in the digital camera whose operation is illustrated in FIG. 18, according to another exemplary embodiment of the present invention. In the current embodiment, B1 and B11 of FIG. 18 may be replaced with B4 and B41, respectively, as another embodiment of the multipoint area setting subroutines.

Referring to FIG. 23, there are two starting points. In the case of B4, it is determined in step S241 whether brightness BVaf<1. The brightness information is brightness information in a focus area that may be obtained from the multi division light measuring illustrated in FIG. 6B. According to the light measuring value, if brightness of a subject is low, the method proceeds to step S244. However, if the brightness of the subject is not low, it is determined in step S242 whether a current mode is the moving picture mode. If the current mode is the moving picture mode, the method proceeds to step S244. If the brightness of the subject is not low and the current mode is not the moving picture mode, in step S243, 15 multi-divided focus areas are set and focusing is examined for each of the small-sized focus areas (corresponding to first focus areas), and the method returns to FIG. 18 to perform AF.

In the case of B41, starting from step S244, a second focus area is set in a shape of a cross in step S244. The shape of a cross corresponds to the shape illustrated in FIG. 10. If a user touches the center area of the touch panel, the second focus area having the shape of a cross in the center area is set in step S249. If the user touches the right area of the touch panel, the second focus area having the shape of a cross in the right area is set in step S248. Otherwise, the second focus area having the shape of a cross in the left area is set in step S247. Illustratively, a user's selection method is changed in this method to a touch from the user's selection method illustrated in FIG. 21, and since the other description is the same as that illustrated in FIG. 21, it is omitted. The second focus area is greater than the first focus area.

Figure 24:
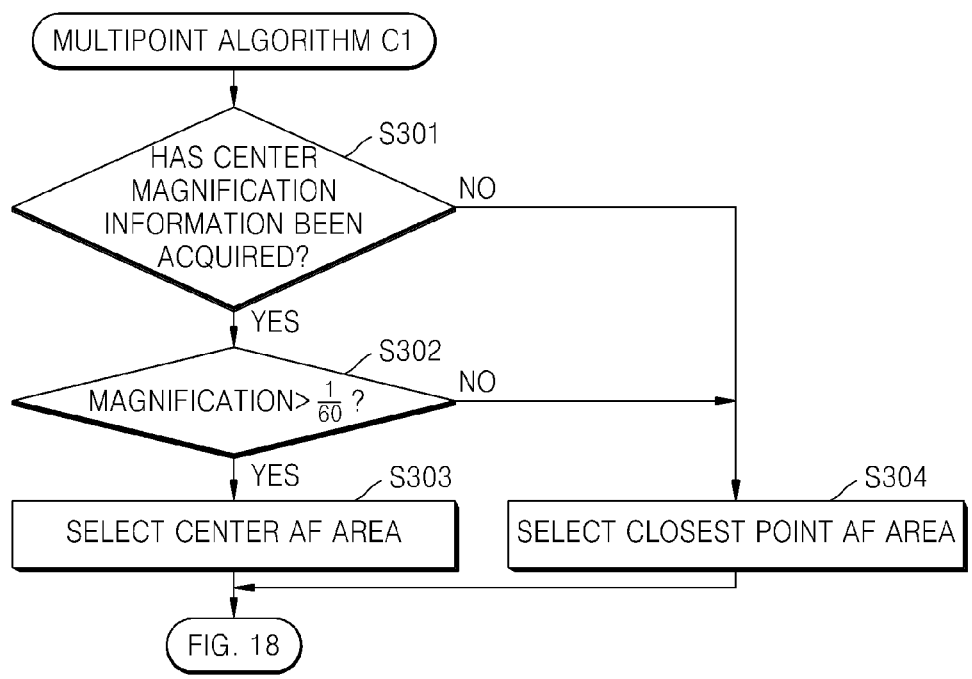
FIG. 24 is a flowchart of an exemplary multipoint method in the operation of the digital camera of FIG. 18.

FIG. 24 is a flowchart of the multipoint method C1 in the digital camera whose operation is illustrated in FIG. 18. In the embodiment, the operation of the multipoint method C1 assumes that focus areas without a low contrast as multi-divided focus areas have been extracted and each peak position has been detected.

It is determined in step S301 whether there is subject magnification information (hereinafter, center magnification) detected by setting the center area of the multi-divided focus areas as a focus area. If the focus area is not set due to a low contrast, the center magnification cannot be obtained. The center magnification may be calculated using a focal distance of the focus lens 104 and a position of the focus lens 104. If there is information regarding the center magnification, it is determined in step S302 whether the center magnification is greater than $\frac{1}{60}$. If the center magnification is greater than $\frac{1}{60}$, it is determined that a probability that a main subject exists in the center area is high, and the center area of the multi-divided focus areas is selected as a focus area in step S303. However, if the center magnification cannot be obtained, or if the center magnification is equal to or less than $\frac{1}{60}$, an area to which a peak position of an AF evaluation value is the closest is selected as a focus area in step S304.

Figure 25:
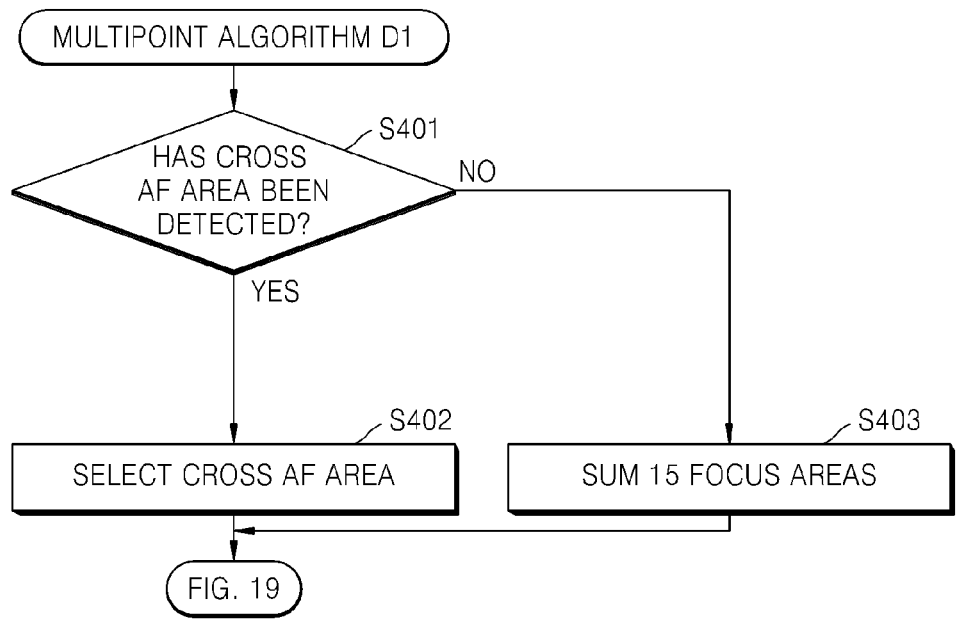
FIG. 25 is a flowchart of another exemplary multipoint method in the operation of the digital camera of FIG. 19A.

FIG. 25 is a flowchart of the multipoint method D1 in the digital camera whose operation is illustrated in FIG. 19A. The operation of the multipoint method D1 is associated with multi-divided focus areas for capturing a moving picture.

Referring to FIG. 25, it is determined in step S401 whether AF detection is possible with a focus area having a shape of a cross. If the sum of AF evaluation values of small-sized focus areas disposed in the focus area having the shape of a cross is greater than a reference value, it may be determined that the AF detection is possible. If the AF detection is possible, an area obtained by summing the small-sized focus areas constituting the shape of a cross is set to a focus area in step S402, and this process returns to FIG. 19A. Otherwise, if the AF detection is impossible, an area obtained by summing 15 small-sized focus areas is set to a focus area in step S403, and the method returns to FIG. 19A.

According to the disclosed embodiments, by adaptively changing a shape of a focus area in a specific condition, a focus adjustment apparatus and method for effectively autofocusing on a subject may be provided.

All references, if any, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to certain embodiments illustrated in the drawings, and specific language has been used to describe these embodiments. However, no limitation of the scope of the invention is intended by these embodiments or this specific language, and the invention should be construed to encompass all embodiments that would normally occur to one of ordinary skill in the art in view of this disclosure. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable medium such as a semiconductor memory, random-access memory (RAM), read-only memory (ROM), CD-ROMs, DVDs, magnetic tapes, hard disks, floppy disks, and optical data storage devices. The computer readable media may also be distributed over network coupled computer systems so that the computer readable code is stored and executed in a distributed fashion. This media can be read by the computer, stored in the memory, and executed by the processor.

Also, using the disclosure herein, programmers of ordinary skill in the art to which the invention pertains may implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various methods being implemented with any combination of data structures, objects, processes, routines or other programming elements. Functional aspects may be implemented using algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development, and other functional aspects of the herein described systems (and components of the individual operating components of the systems) may not be described in detail. Furthermore, the connecting lines, or connectors shown in the various figures presented are intended to represent exemplary functional relationships and/ or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all embodiments within the scope of the claims will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of any ranges of values herein are merely intended to serve as a shorthand method of referring individually to each separate value falling within the range, unless otherwise indicated herein, and each separate value is incorporated into the specification as if it were individually recited herein.

What is claimed is:
1. A focus adjustment apparatus comprising:
a focus lens;
a focus lens driver configured to drive the focus lens in an optical axis direction; an image pickup unit configured to generate an image signal by converting image light incident through the focus lens into an electrical signal;

a determiner configured to determine whether the brightness of the image signal is low by comparing brightness information of the image signal to reference brightness information;

a focus area setting unit configured to set a first focus area if the brightness of the image signal is not low and sets a second focus area, which is greater than the first focus area and has a shape of which a width of an upper part is narrower than a width of a lower part, if the brightness of the image signal is low; and a controller configured to control movement of the focus lens to adjust a focus on an image signal corresponding to the set focus area.

2. The focus adjustment apparatus of claim 1, wherein the focus area setting unit sets the focus area in one of a shape of which an upper part protrudes and a shape of a cross.

3. The focus adjustment apparatus of claim 1, further comprising a position sensor configured to sense whether the focus adjustment apparatus is oriented in a horizontal or vertical direction relative the ground, wherein the focus area setting unit sets a focus area having a shape of which a width of an upper part is narrower than the width of the lower part relative the ground if the focus adjustment apparatus is oriented in either of the horizontal or vertical direction.

4. The focus adjustment apparatus of claim 1, further comprising an operating unit configured to input a signal to adjust at least one of the size and position of the focus area.

5. The focus adjustment apparatus of claim 4, wherein the operating unit has a touch panel configured to input the signal by a user's touch.

6. The focus adjustment apparatus of claim 1, wherein the first focus area has a shape in which the width of the upper part is not narrower than the width of the lower part.

7. A focus adjustment method comprising:
generating an image signal by converting image light incident through a focus lens into an electrical signal;
determining whether brightness of the image signal is low by comparing brightness information of the image signal to reference brightness information;
setting, using a focus area setting unit, a first focus area if the brightness of the image signal is not low, and if the brightness of the image signal is low, setting a second focus area which is greater than the first focus area and has a shape of which a width of an upper part is narrower than a width of a lower part; and
moving the focus lens to adjust a focus on an image signal corresponding to the set focus area.

8. The focus adjustment method of claim 7, wherein the focus area is set in one of a shape of which an upper part protrudes and a shape of a cross.

9. The focus adjustment method of claim 7, further comprising sensing whether a focus adjustment apparatus is oriented in a horizontal or vertical direction relative the ground, wherein the focus area having the shape of which the width of the upper part is narrower than the width of the lower part is set relative the ground if the focus adjustment apparatus is oriented in either of the horizontal or vertical direction.

10. The focus adjustment method of claim 7, further comprising selecting, by a user, at least one of a size and a position of the focus area.

11. The focus adjustment method of claim 10, wherein the focus area is selected by the user's touch.

12. The focus adjustment method of claim 7, wherein the first focus area has a shape in which the width of the upper part is not narrower than the width of the lower part.

13. A non-transitory computer readable storage medium storing computer readable instructions which, when read by an automated focus adjustment apparatus, cause the focus adjustment apparatus to perform a method comprising:
generating an image signal by converting image light incident through a focus lens into an electrical signal;
determining whether brightness of the image signal is low by comparing brightness information of the image signal to reference brightness information;
setting a first focus area if the brightness of the image signal is not low, and if the brightness of the image signal is low, setting a second focus area which is greater than the first focus area and has a shape of which a width of an upper part is narrower than a width of a lower part; and
moving the focus lens to adjust a focus on an image signal corresponding to the set focus area.

* * * * *